United States Patent
Kravets et al.

(10) Patent No.: US 10,466,842 B2
(45) Date of Patent: Nov. 5, 2019

(54) SUPPRESSING NOISE IN TOUCH PANELS USING A SHIELD LAYER

(71) Applicant: Cypress Semiconductor Corporation, San Jose, CA (US)

(72) Inventors: Igor Kravets, Lviv (UA); Volodymyr Bihday, Lviv (UA); Ihor Musijchuk, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/122,014

(22) Filed: Sep. 5, 2018

(65) Prior Publication Data
US 2019/0079634 A1    Mar. 14, 2019

Related U.S. Application Data

(60) Provisional application No. 62/557,472, filed on Sep. 12, 2017.

(51) Int. Cl.
*G06F 3/041*    (2006.01)
*G06F 3/045*    (2006.01)
*G06F 3/044*    (2006.01)

(52) U.S. Cl.
CPC ........... *G06F 3/0418* (2013.01); *G06F 3/045* (2013.01); *G06F 3/044* (2013.01); *G06F 2203/04107* (2013.01); *G06F 2203/04112* (2013.01)

(58) Field of Classification Search
CPC ........... G06F 2203/04107; G06F 3/045; G06F 2203/04112; G06F 3/044; G06F 3/0418
See application file for complete search history.

(56) References Cited

U.S. PATENT DOCUMENTS

| 8,493,356 | B2 | 7/2013 | Joharapurkar et al. |
| 8,536,880 | B2 | 9/2013 | Philipp |
| 9,151,792 | B1 | 10/2015 | Kremin et al. |
| 9,229,577 | B2 | 1/2016 | Kremin et al. |
| 9,323,385 | B2 | 4/2016 | Antwerpen et al. |

(Continued)

FOREIGN PATENT DOCUMENTS

WO    2013181974 A1    12/2013

OTHER PUBLICATIONS

International Search Report for International Application No. PCT/US18/50035 dated Nov. 9, 2018; 2 pages.

(Continued)

*Primary Examiner* — Muhammad N Edun

(57) ABSTRACT

A method, apparatus, and system measure, at a first channel of a processing device, a first signal indicative of a touch object proximate to an electrode layer. The first signal includes a touch data component and a first noise component generated by a noise source. The method, apparatus, and system measure, at a second channel of the processing device, a second signal including a second noise component generated by the noise source. The second channel is coupled to a shield layer disposed between the noise source and the electrode layer. The method, apparatus, and system generate an estimated noise signal using the second noise component of the second signal that is associated with the second channel. The method, apparatus, and system subtract the estimated noise signal from the measured first signal to obtain the touch data component of the first signal.

20 Claims, 14 Drawing Sheets

(56) References Cited

U.S. PATENT DOCUMENTS

| | | |
|---|---|---|
| 9,329,314 B2 | 5/2016 | Chen et al. |
| 9,727,170 B2 | 8/2017 | Lee et al. |
| 9,864,466 B2 | 1/2018 | Goudarzi |
| 9,946,378 B2 | 4/2018 | Deng et al. |
| 2011/0285654 A1* | 11/2011 | Park ............... G06F 3/0418 345/173 |
| 2013/0010216 A1 | 1/2013 | Kang et al. |
| 2015/0049055 A1* | 2/2015 | Post ............... G06F 3/046 345/174 |
| 2015/0123677 A1* | 5/2015 | Ding ............... G06F 3/0418 324/613 |
| 2015/0145535 A1 | 5/2015 | Nys et al. |
| 2015/0153870 A1 | 6/2015 | Lee et al. |
| 2016/0018921 A1* | 1/2016 | Matlick ........... G06F 3/0416 345/174 |
| 2017/0068838 A1 | 3/2017 | Kravets et al. |

OTHER PUBLICATIONS

Written Opinion of the International Searching Authority for International Application No. PCT/US18/50035 dated Nov. 9, 2018; 6 pages.

\* cited by examiner

SUPPRESSING NOISE IN TOUCH PANELS USING A SHIELD LAYER

RELATED APPLICATIONS

This application claims the benefit of U.S. Provisional Application No. 62/557,472, filed Sep. 12, 2017, which is hereby incorporated herein by reference in its entirety.

TECHNICAL FIELD

The present disclosure relates generally to sensing systems, and more particularly to capacitance measurement systems configurable to suppress noise in touch panels using shield layers.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs, and other similar mechanical user interface controls. The use of a capacitive sense element allows for the elimination of complicated mechanical switches and buttons, providing reliable operation under harsh conditions. In addition, capacitive sense elements are widely used in modern consumer applications, providing user interface options in existing products. Capacitive sense elements can range from a single button to a large number arranged in the form of a capacitive sense array for a touch-sensing surface of a touch panel.

Capacitive sense arrays and touch buttons are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element and evaluating for a delta in capacitance indicating a touch or presence of a touch object. When a touch object (e.g., a finger, hand, or other conductive object) comes into contact or close proximity with a capacitive sense element, the capacitance changes and the conductive object is detected. The capacitance changes can be measured by an electrical circuit. The electrical circuit converts the signals corresponding to measured capacitances of the capacitive sense elements into digital values. The measured capacitances are generally received as currents or voltages that are integrated and converted to the digital values.

There are two typical types of capacitance: 1) mutual capacitance where the capacitance-sensing circuit measures a capacitance formed between two electrodes coupled to the capacitance-sensing circuit; 2) self-capacitance where the capacitance-sensing circuit measure a capacitance of one electrode. A touch panel may have a distributed load of capacitance of both types (1) and (2) and some touch solutions sense both capacitances either uniquely or in hybrid form with its various sense modes.

BRIEF DESCRIPTION OF THE DRAWINGS

The present embodiments are illustrated by way of example, and not of limitation, in the figures of the accompanying drawings.

DETAILED DESCRIPTION

Figure 1:
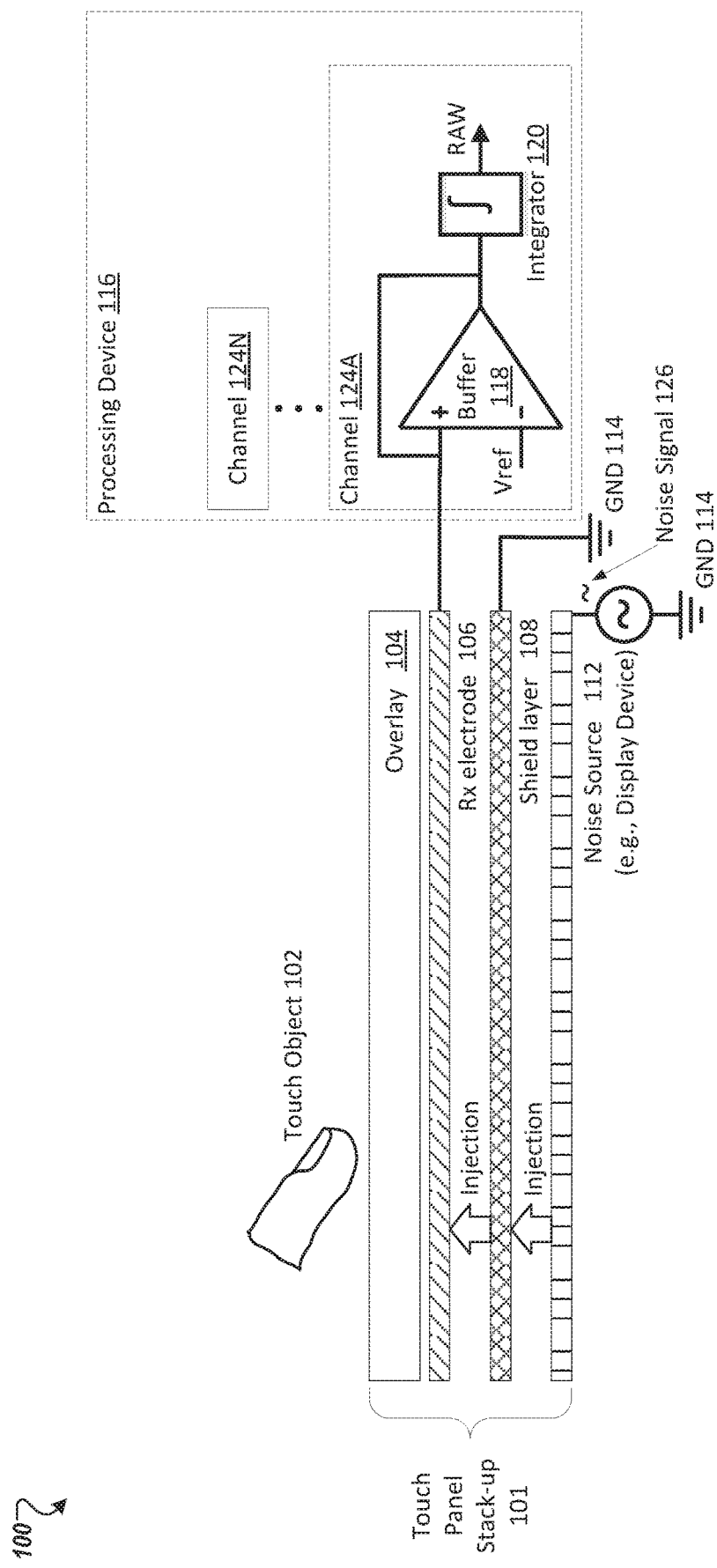
FIG. 1 is a block diagram illustrating a touch panel stack up, in accordance with aspects of the disclosure.

In the following description, for purposes of explanation, numerous specific details are set forth in order to provide a thorough understanding of the present embodiments. It will be evident, however, to one skilled in the art that the present embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment. The phrase "in one embodiment" located in various places in this description does not necessarily refer to the same embodiment.

In some touch sensing systems, such as capacitive touch sensing systems, a noise source of a touch panel may generate noise signals that interfere with the detection of a touch object proximate the touch panel. For example, an electrode layer (also referred to as a "sense array" herein)

may be disposed above a display device, such as a liquid crystal display of a touch panel. A noise signal from the operation of the display device may couple to the electrode layer via parasitic capacitive coupling. The coupled noise signal may interfere with the measuring signal (e.g., a transmission (Tx) signal) at the electrode layer used to detect a touch object proximate the electrode layer.

In some touch sensing systems, a shield layer disposed between the electrode layer and display device is used to help shield the electrode layer from the noise signal generated by the display device. The shield layer may be coupled to a ground potential. However, the shield layer has sheet resistance that creates a voltage potential in the presence of the noise signal. Thus, the noise signal is coupled to the electrode layer via parasitic capacitive coupling between the electrode layer and shield layer, which obscures with the measuring signal used to detect a touch object.

Some touch sensing systems, may use a first electrode of the electrode layer to sample the noise signal. After sampling the noise signal, a second different electrode (or same electrode) may be used to subsequently measure a touch using a measuring signal. The sampled noise signal from the first electrode may be used to reduce the noise from the measuring signal measured at the second electrode. However such systems may suffer from linearity and accuracy degradation. Such systems may be highly sensitive to a touch by a touch object. Sampling and measuring may be performed sequentially for systems that are highly sensitive to a touch. For example, if the above system concurrently measures the first electrode for the noise signal and the second electrode for the measuring signal, the first electrode samples a large amount of the measuring signal and the touch data associated therein. Using the signal from the first electrode, which includes a large amount of the measuring signal, to reduce the noise of the measuring signal of the second electrode eliminates a large portion of the usable data (e.g., touch data) from the measuring signal leading to inaccurate touch measurements.

Aspects of the disclosure address the above and other challenges by measuring, at a first channel of a processing device, a first signal indicative of a touch object proximate to an electrode layer. A channel may refer to hardware, firmware, software, or combination thereof use to receive, manipulate, or measure a received signal. The first channel is coupled to the electrode layer. The first signal includes a touch data component and a first noise component generated by a noise source. The second channel of the processing device measures a second signal including a second noise component generated by the noise source. The second channel is coupled to a shield layer disposed between the noise source and the electrode layer. An estimated noise signal is generated using the second noise component of the second signal that is associated with the second channel. The estimated noise signal is an estimation of the first noise component of the first signal. The estimated noise signal is subtracted from the measured first signal to obtain the touch data component of the first signal. In an embodiment, measuring the first signal at the first channel is performed concurrently with the measuring of the second signal.

The noise signal sampled at the shield layer includes a negligible amount of the measuring signal because the shield layer is further away from the touch object, is partially shielded by the above electrode layer. The measuring signal that is injected from the electrode layer to the shield layer may be significantly attenuated (e.g., by an order of magnitude). This reduces the amount of the measuring signal (and touch data component therein) that is coupled to the shield layer and sampled a the second channel. The signal obtained from the shield layer can be used to reduce the noise from the measuring signal without significantly impacting the usable touch data of the measuring signal.

Aspects of the disclosure may be applied to self-capacitance measuring techniques or mutual capacitance measuring techniques.

FIG. 1 is a block diagram illustrating a touch panel stack up, in accordance with aspects of the disclosure. System 100 shows a touch panel stack-up 101 that illustrates various layers that are included in a touch panel. A touch panel may display images and video to users and be included in various electronic devices, such as mobile devices or front panel displays. A touch panel may also be used in conjunction with processing device 116 to detect a touch (also referred to as a "touch event") by a touch object 102 (e.g., a human finger or other touch object) proximate to the touch panel. For example, a touch by touch object 102 in physical contact with overlay may be detected. In another example, a touch by touch object some distance above overlay 104 (e.g., hovering approximately 35 millimeters (mm) above overlay 104) may also be detected. It can be noted that a touch object proximate the touch panel may be detected at distances greater than 35 mm using aspects of the present disclosure.

In an embodiment, the touch panel stack-up 101 may include one or more of an overlay 104, an electrode layer 106, a shield layer 108 or a noise source 112. As illustrated, each of the aforementioned layers may be disposed above the subsequently mentioned layer(s). For example, the overlay 104 is disposed above electrode layer 106, shield layer 108, and noise source 112. In another example, shield layer 108 may be disposed between the electrode layer 106 and noise source 112.

In an embodiment, overlay 104 may be a transparent or semi-transparent material that is disposed above the electrode layer 106. The overlay 104 may provide protection or other functionality, such as filtering, to the underlying layers.

In an embodiment, the electrode layer 106 (also referred to as a "sense array" herein) includes one or more electrodes. In an embodiment, the electrode layer 106 may be a capacitive sense array. For purposes of illustration, rather than limitation, touch panel stack-up 101 is illustrated with a single electrode (i.e., a receiving (Rx) electrode). If can be appreciated that the electrode layer 106 may include many electrodes, such as multiple transmission (Tx) electrodes and multiple Rx electrodes. The electrode layer 106 can be used to sense touch object 102 proximate to the electrode layer 106. For example, in mutual capacitance mode a Tx signal may be generated and coupled to a Tx electrode. From the Tx electrode the Tx signal may be capacitively coupled to a respective Rx electrode. A change in the capacitance between the Tx electrode and respective Rx electrode is measured (e.g., the measuring signal) at the Rx electrode of electrode layer 106 in the presence of a touch object 102. The measuring signal may include a touch data component indicative of a touch object 102 proximate to the Rx electrode of electrode layer 106. In mutual capacitance mode, the measuring signal may be an induced current at the Rx electrode caused by the Tx signal from the respective Tx electrode. In another example, in self-capacitance mode an Rx electrode can be excited using an excitation signal (e.g., by varying the ground potential). A touch object proximate the Rx electrode can capacitively couple with the respective Rx electrode and change the capacitance sensed at the Rx electrode. A change in the capacitance at the Rx electrode (e.g., from having no touch object proximate the Rx electrode to having a touch object proximate the Rx electrode)

can be measured using the measuring signal. The measuring signal may include a touch data component indicated of a touch object 102 proximate to the Rx electrode of the electrode layer. In self-capacitace mode, the measuring signal may be an induced signal at the Rx electrode caused by the excitation signal.

In embodiments, the electrode layer 106 may be a transparent or semi-transparent conductive material, such as indium tin oxide (ITO). Electrode layer 106 (i.e., sense array) and touch detection is further described with respect to FIG. 11.

In an embodiment, the shield layer 108 may be used to help shield electrode layer 106 from parasitic noise signals. For example, noise from noise source 112 may be injected into the electrode layer 106 via parasitic capacitive coupling. The noise that is injected into the electrode layer 106 by noise source 112 may be combined with a measuring signal that includes touch data and decrease the accuracy of touch detection. A shield layer 108 may be used to help de-couple one or more noise sources, such as noise source 112, from the electrode layer 106 and increase the accuracy of a measuring signal. In the current example, shield layer 108 is coupled to system ground 114, which may refer to the ground potential of the device in which the touch panel stack-up 101 is implemented. For example, in a mobile device the system ground 114 may be battery of the mobile device. In embodiments, the shield layer 108 may be a transparent or semi-transparent conductive material. The material of the shield layer may be a similar material as described with respect to electrode layer 106. For example, the shield layer may include indium tin oxide (ITO). In an embodiment, the shield layer 108 is a contiguous, planar, and conductive material.

In an embodiment, the noise source 112 is disposed below the shield layer 108. In an embodiment, the noise source 112 may generate a noise signal, as illustrated by noise signal 126. The noise signal 126 generated by noise source 112 may be injected into the shield layer 108 and the electrode layer 106 via parasitic coupling. For example, a first noise component of noise signal 126 may be injected into the electrode layer 106 (e.g., the Rx electrode) and a second noise component of the noise signal 126 may be injected into the shield layer 108. The noise signal 126 may include both the first noise component and the second noise component. The first and second noise components may be proportional to one another. The property of proportionality of the first and second noise components of the noise signal 126 may be used to help cancel the first noise component received at the Rx electrode, as illustrated below and in aspects of the disclosure.

In an embodiment, a measuring signal is measured by an Rx channel, such as channel 124A. The injected noise signal 126 may become a part of the measuring signal, e.g., noise component of the measuring signal. The measuring signal may also include a touch data component (e.g., a voltage or current indicating a change in capacitance), which may be obscured by the noise signal and lead to decreased accuracy in touch detection.

In some embodiments, the noise source 112 may include a display device, such as a liquid crystal display (LCD). In other embodiments, the display device may be a different type of display, such as an organic light emitting diode (OLED) display or other type of display device.

In an embodiment, the electrode layer 106 is coupled to processing device 116. Processing device 116 may measure signal changes, such as capacitance changes, of electrode layer 106 and produce digital outputs (also referred to as "counts" or "digital counts" herein) indicative of a touch proximate to a touch panel. In an embodiment, each Rx electrode may be coupled to a separate channel 124A-124N of processing device 116. It can be noted that in other embodiments, a channel may be coupled to more than one Rx electrode at a single instance in time. In still other embodiments, a channel may couple to multiple Rx electrodes but only to one Rx electrode at a particular time (e.g., via a multiplexer).

In an embodiment, a channel, such as channel 124A, may include hardware or firmware to measure a signal, such as a measuring signal, received from the respective Rx electrode of electrode layer 106. For example, the measuring signal may be received by a buffer 118. The buffer may buffer or amplify the received measuring signal. In an embodiment, the buffer 118 may be a unity-gain buffer. In other embodiments, the buffer 118 may have some amount of gain. In an embodiment, the positive terminal of buffer 118 may be connected to the output of buffer 118. The negative terminal of buffer 118 may be coupled to a reference voltage. In other embodiments, a buffer with different configurations may be implemented.

In an embodiment, the buffered measuring signal at the output of buffer 118 may be integrated by integrator 120. Integrator 120 may integrate the buffered measuring signal to combine the buffered measuring signal to produce a raw measuring signal. In an embodiment, the integrated measuring signal is an analog voltage or current. In one embodiment, the measuring signal may include a current (e.g., charge) that is integrated (e.g., accumulate the charge) on a capacitor. The integrated current can be detected as a voltage change. In embodiments, integrator 120 may be a hardware circuit, firmware, or a combination thereof. In some embodiments, a particular channel 124A-124N may include the same, different, more, or fewer components in different or the same configuration as illustrated in FIG. 1. It can be noted that the components illustrated with respect to channel 124A are provided for purposes of illustration, rather than limitation.

Figure 2:
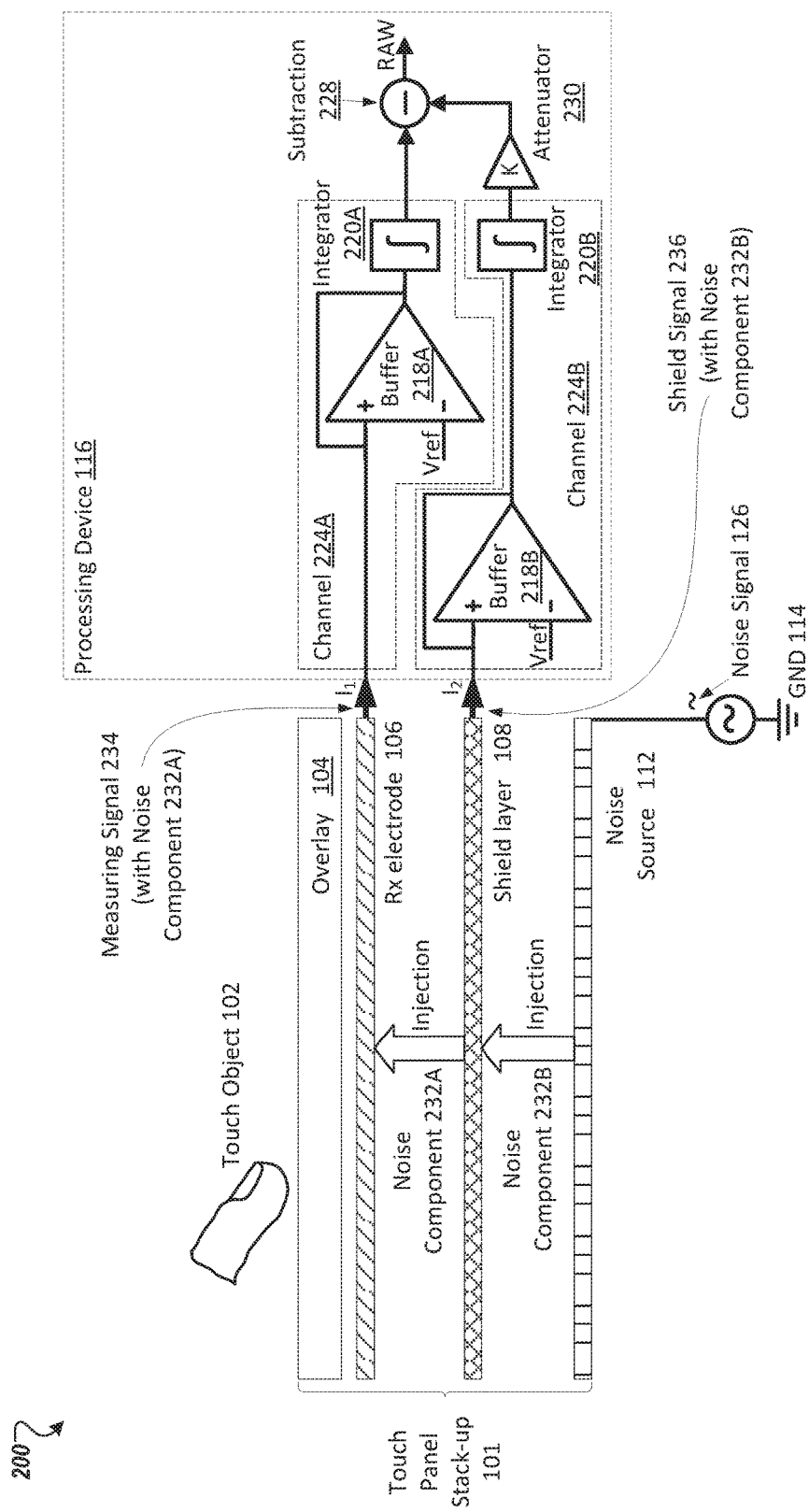
FIG. 2 is a block diagram illustrating system to suppress noise of a touch panel, in accordance with aspects of the disclosure.

FIG. 2 is a block diagram illustrating system 200 to suppress noise of a touch panel, in accordance with aspects of the disclosure. Components of FIG. 1 are used to help describe aspects of FIG. 2. FIG. 2 shows the touch panel stack-up 101 as illustrated in FIG. 1. Channel 224A and the components therein may be similar to channel 124A of FIG. 1. Buffer 218A and 218B may be similar to buffer 118 of FIG. 1. Integrator 220A and 220B may be similar to integrator 120 of FIG. 1.

As shown in FIG. 2, Rx electrode of electrode layer 106 is coupled to channel 224A and shield layer 108 is coupled to channel 224B. Both channels 224A and 224B are part of processing device 116. In an embodiment, channel 224A and channel 224B (generally referred to as "channel(s) 224" herein) are physically separate channels (e.g., coupled to two distinct output pins of processing device 116). Each channel 224 may include its own hardware. In an embodiment, different channels may be coupled to single pin of the processing device 116 at different instances in time using for example, a switch or multiplexer. For example, the shield layer 108 can be coupled to channel 224B during times when reducing the touch panel noise from the measuring signal is determined to be important. At other times, channel 224B can be coupled to an Rx electrode of the electrode layer 106 to measure a respective measuring signal.

The output of integrator 220B of the channel 224B is coupled to the input of attenuator 230. The output of attenuator 230 is coupled to a subtraction module 228 capable of subtracting one signal from another signal. In embodiments, attenuator 230 may include an attenuator circuit, firmware, or a combination thereof. In embodiments, subtraction module 228, may include circuitry, firmware, or a combination thereof. In an embodiment, attenuator 230 or subtraction module 228 is part of a channel 224A or 224B. In other embodiments, attenuator 230 or subtraction module 228 may be outside channels 224.

Noise signal 126 is coupled to both the shield layer 108 and the Rx electrode of the electrode layer 106. The coupled noise signal 126 is illustrated having a first noise component 232A coupled to the Rx electrode of electrode layer 106 and a second noise component 232B coupled to the shield layer 108. First noise component 232A is coupled to channel 224A and second noise component 232B is coupled to 224B.

In an embodiment, a measuring signal 234 is received at channel 224A. The measuring signal 234 may be indicative of a touch by touch object 102 proximate to the electrode layer 106. The measuring signal 234 may include a touch data component indicative of a touch proximate to the electrode layer 106 and a first noise component 232A. For example, in a mutual capacitance implementation a Tx transmission signal may be transmitted to a Tx electrode. The presence of touch object 102 changes the capacitance between the Tx electrode and the respective Rx electrode of electrode layer 106. The information of the change in capacitance is included in the touch data component of the measuring signal 234. The noise component 232A injected by the noise source 112 is also coupled to the Rx electrode of the electrode layer 106 and included in the measuring signal 234.

In an embodiment, a shield signal 236 is received at channel 224B. The shield signal 236 can include the second noise component 232B.

In an embodiment, the measuring signal 234 is measured at channel 224A of processing device 116. In an embodiment, the measuring can include buffering the measuring signal 234 at buffer 218A and integrating the buffered measuring signal at integrator 220A, as further described with respect to FIG. 1.

In an embodiment, the shield signal 236 that includes the second noise component 232B is measured at channel 224B of processing device 116. In an embodiment, the measuring can include buffering the shield signal 236 at buffer 218B and integrating the buffered shield signal at integrator 220B.

In an embodiment, processing device 116 may generate an estimated noise signal using the second noise component 232B of the shield signal 236. The estimated noise signal may be an estimation of the first noise component 232A of the measuring signal 234 received at channel 224A. In an embodiment, generating the estimated noise signal using the second noise component 232B of the shield signal 236 includes multiplying the shield signal 236 (e.g., the integrated shield signal) at an attenuator 230 by an attenuation coefficient (K). It can be noted that an attenuation coefficient may be any real number. Attenuation may include reducing a signal, amplifying a signal, or buffering a signal (e.g., attenuation coefficient of 1).

In an embodiment, the estimated noise signal may be subtracted from the measuring signal 234 (e.g., the integrated measuring signal) by subtraction module 228.

For example, the second noise component 232B may be proportional to the first noise component 232A of the noise signal 126. As such, the shield signal 236 (e.g., integrated shield signal) that includes the second noise component 232B may be attenuated (or amplified) by an attenuation coefficient (K) to generate an estimated noise signal. The estimated noise signal may be attenuated so that the estimated noise signal may be similar in magnitude as the first noise component 232A of the measuring signal 234 received at channel 224A. The estimated noise signal can be subtracted from the measuring signal 234 to remove or reduce the first noise component 232A of the measuring signal 234. The remaining touch data component of the measuring signal 234 can be used to detect a touch proximate to the electrode layer 106. The above operations can be performed in the presence of a touch object proximate the touch panel or with no touch object present.

Figure 3:
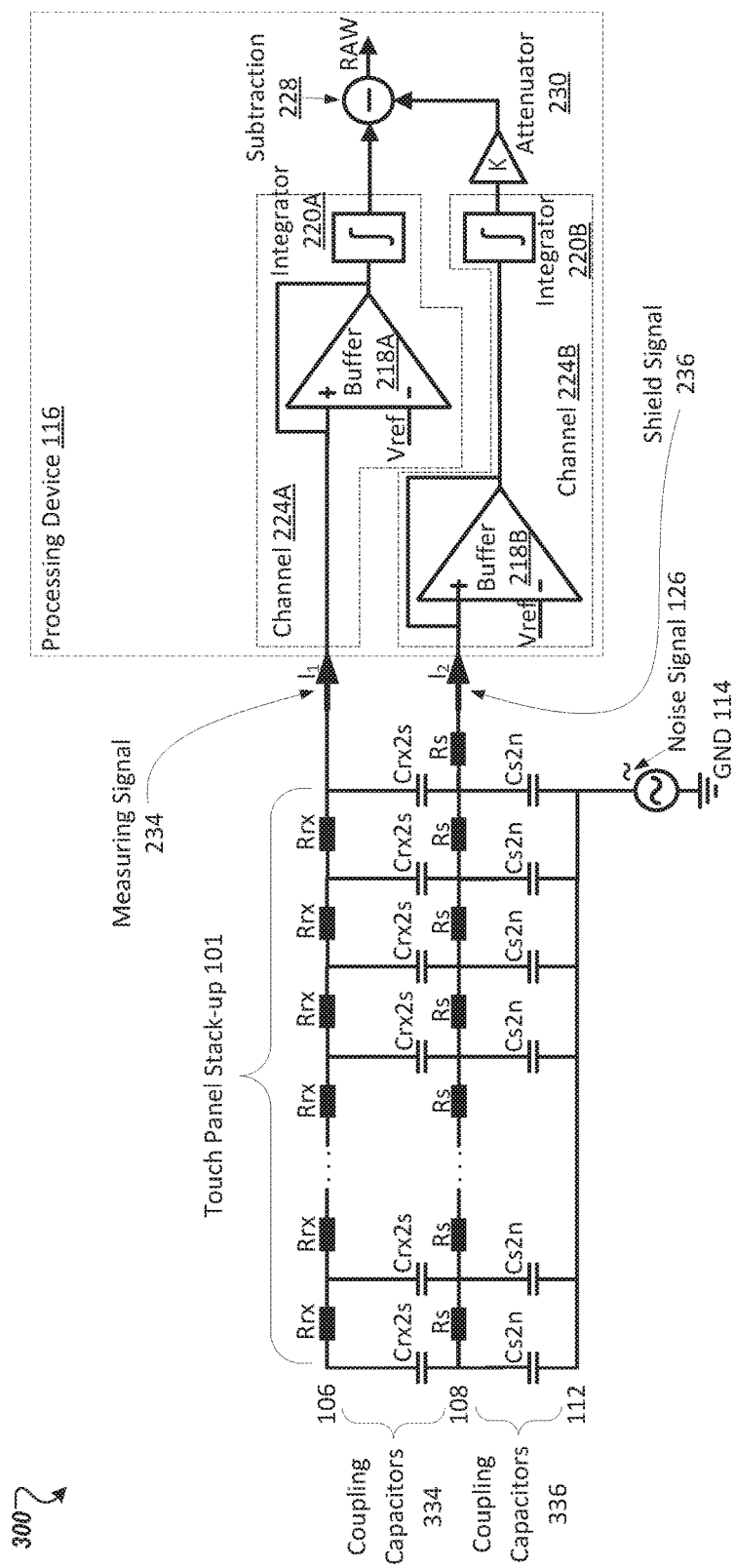
FIG. 3 is a block diagram illustrating a system to suppress noise of a touch panel and includes a circuit model of the touch panel stack-up, in accordance with aspects of the disclosure.

FIG. 3 is a block diagram illustrating a system 300 to suppress noise of a touch panel and includes a circuit model of the touch panel stack-up, in accordance with aspects of the disclosure. Components of FIGS. 1 and 2 are used to help describe aspects of FIG. 3. FIG. 3 illustrates a circuit model of touch panel stack-up 101. Rx electrode of electrode layer 106 is represented by multiple resistors ($R_{rx}$) coupled in series to channel 224A of processing device 116. The shield layer 108 is represented by multiple resistors ($R_s$) coupled in series to channel 224B of processing device 116. Coupling capacitors 336 ($C_{s2n}$) represent the parasitic capacitive coupling between the shield layer 108 and the noise source 112. Coupling capacitors 334 ($C_{rx2s}$) represent the parasitic capacitive coupling between the Rx electrode of the electrode layer 106 and the shield layer 108.

Figure 4:
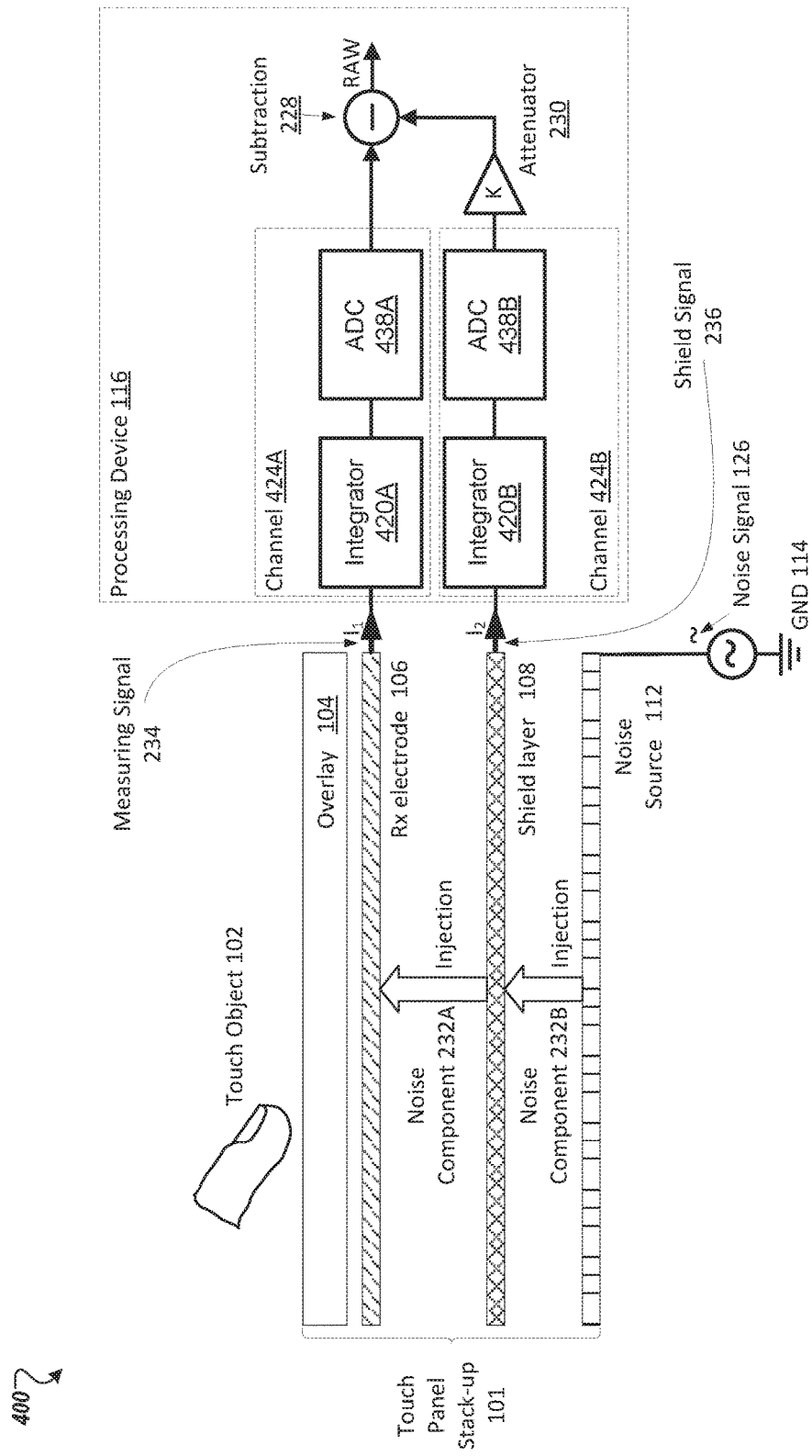
FIG. 4 is a block diagram illustrating a system to suppress noise of a touch panel with an alternative circuit implementation, in accordance with aspects of the disclosure.

FIG. 4 is a block diagram illustrating a system 400 to suppress noise of a touch panel with an alternative circuit implementation, in accordance with aspects of the disclosure. Components of FIGS. 1 and 2 are used to help describe aspects of FIG. 4. Integrator 420A and 420B may be similar to integrator 120 of FIG. 1.

Channel 424A and channel 424B may each include integrator 420A and integrator 420B, respectively. Integrator 420A and 420B may be similar to integrator 120 of FIG. 1. Channel 424A and channel 424B (generally referred to as "channel(s) 424" herein) may each include an analog-to-digital converter (ADC) 438A and 438B, respectively (generally referred to as "ADC(s) 438" herein). The ADC 438 may convert an analog signal into an equivalent digital signal. For example, measuring signal 234 at channel 224A may be integrated by integrator 420A. The integrated measuring signal 234 maybe converted from an analog signal to a digital signal by ADC 438A. Similarly, the shield signal 236 at channel 224B may be integrated by integrator 420A. The integrated shield signal 236 may be converted from an analog signal to a digital signal by ADC 438B.

System 400 may provide similar noise suppression as described with respect to the previous figures. In an embodiment, the digital shield signal 236 may be attenuated by attenuator 230. The attenuated digital shield signal 236 may be subtracted from digital measuring signal 234 using subtraction module 228. In an embodiment, attenuator 230 or subtraction module 228 is part of a channel 424A or 424B. In other embodiments, attenuator 230 or subtraction module 228 may be outside channels 424.

Figure 5:
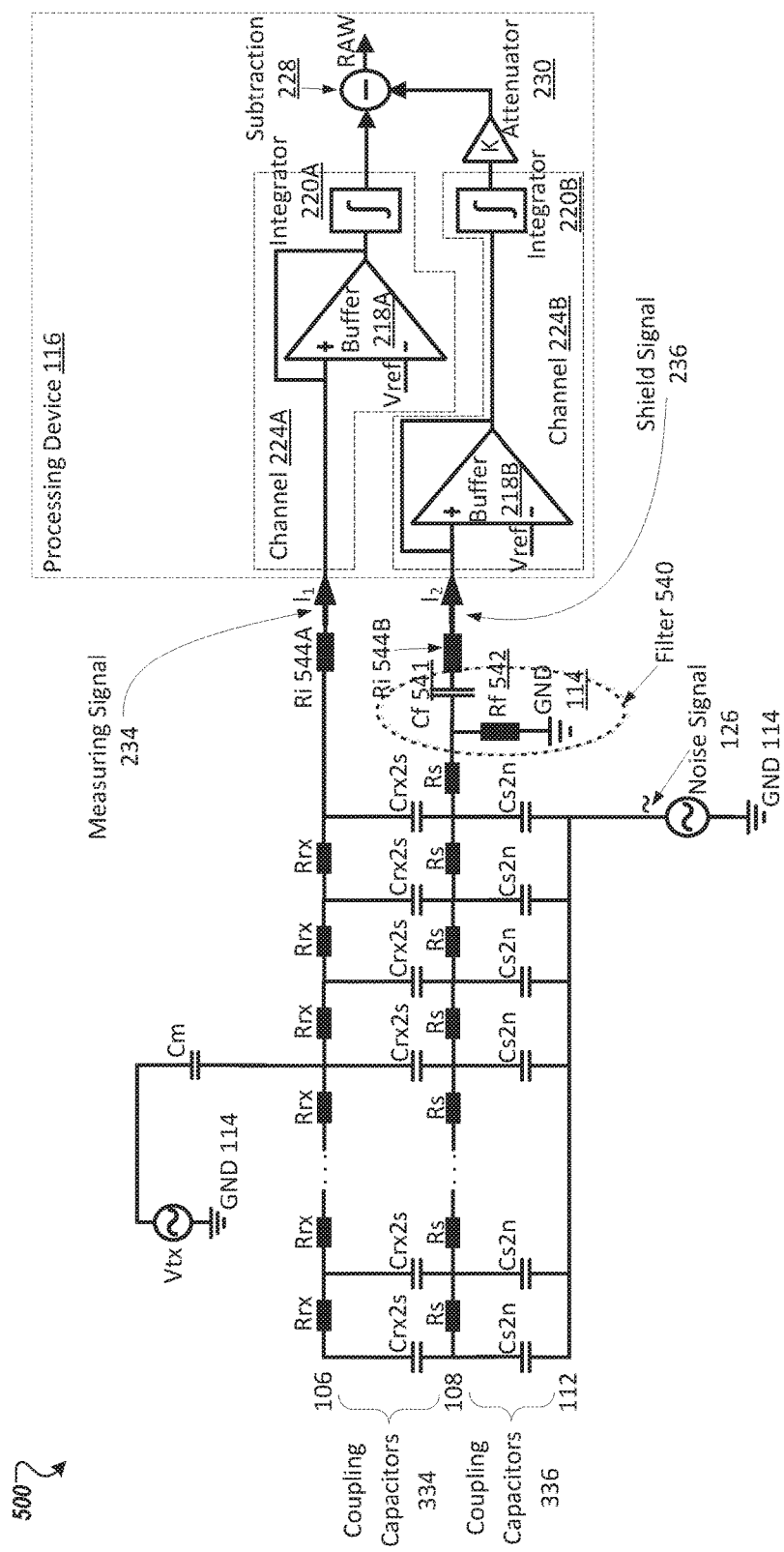
FIG. 5 is a block diagram illustrating a system to suppress noise of a touch panel including a filter, in accordance with aspects of the disclosure.

FIG. 5 is a block diagram illustrating a system 500 to suppress noise of a touch panel including a filter, in accordance with aspects of the disclosure. Components of FIG. 1-4 are used to help describe aspects of FIG. 5. It can be noted that any unlabeled components may be similar to their labelled counterparts in previous Figures.

In an embodiment, system 500 may implement a filter 540 between the shield layer 108 and the input of buffer 218B. The filter 540 may be used to create a similar transfer function between the first noise component 232A of the measuring signal 234 and the second noise component 232B of the shield signal 236, as will be further described with respect to FIG. 6.

In an embodiment, filter 540 may include a capacitor 541 ($C_f$) coupled in series with channel 224B and the shield layer 108. In an embodiment, filter 540 may include a resistor 542 ($R_f$). Resistor 542 may include a first terminal coupled between the shield layer 108 and channel 224B. Resistor 542 may include a second terminal coupled to a ground potential, such as system ground 114. In an embodiment, the filter 540 includes both the capacitor 541 and the resistor 542. In an embodiment, one or more of capacitor 541 and resistor 542 are implemented as discrete components outside of processing device 116. In another embodiment, one or more of capacitor 541 and resistor 542 are integrated as on-chip components of processing device 116.

In an embodiment, resistor 544A ($R_i$) may be coupled between the Rx electrode of electrode layer 106 and buffer 218A. In an embodiment, resistor 544B ($R_i$) may be coupled between the shield layer 108 and the input of buffer 218B. In embodiments, one or more resistor 544A and 544B (generally referred to as "resistor(s) 544") may be off-chip or on-chip components. Resistors 544 may assist with immunity, such as transient immunity or radio-frequency immunity.

It can be noted that one or more channels may have similar immunity resistors. For example, each channel may have a similar immunity resistor coupled between the respective Rx electrode of the electrode layer 106 and the respective channel of processing device 116.

Figure 6:
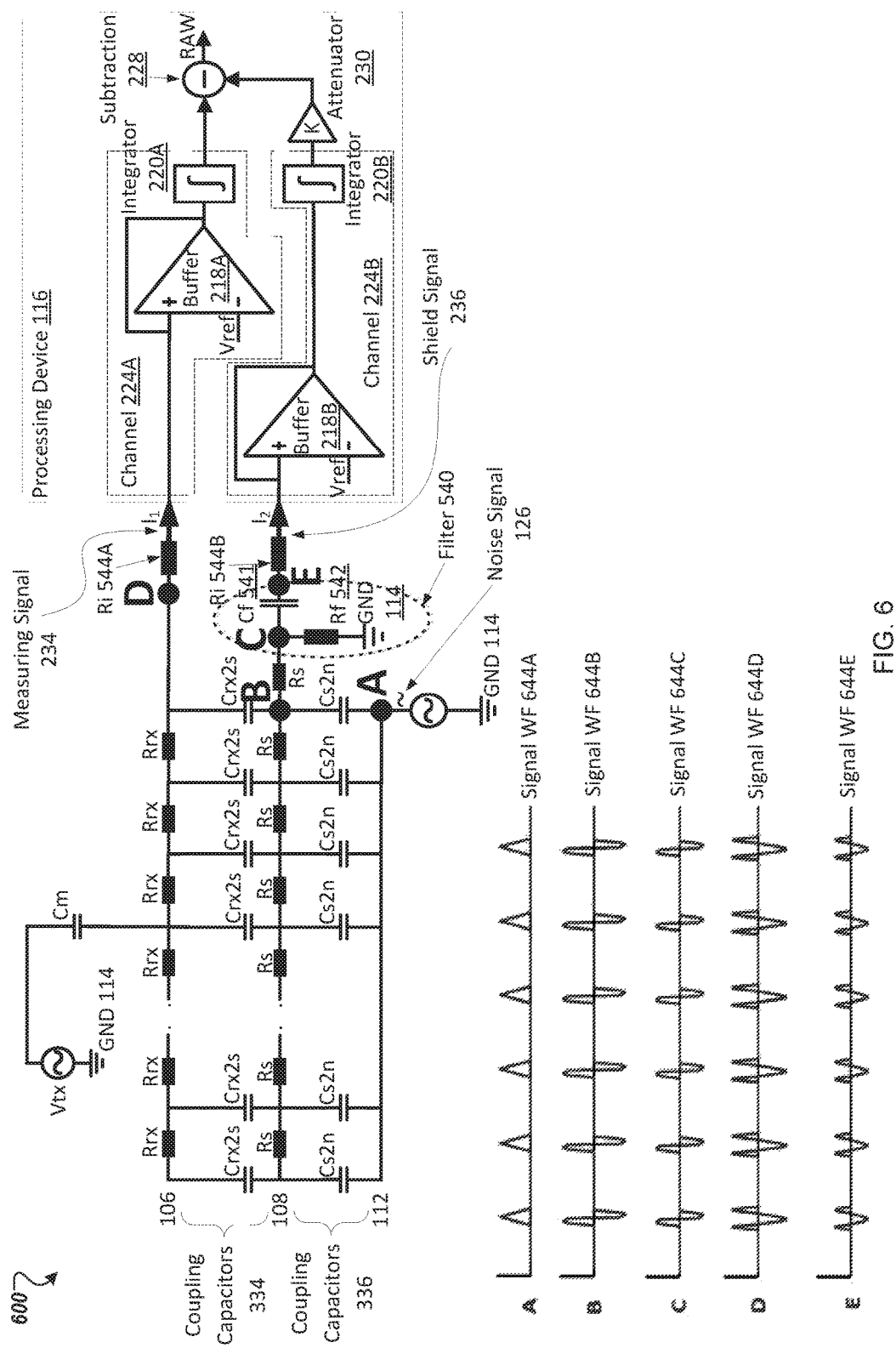
FIG. 6 is a block diagram illustrating the path of the noise signal in a system to suppress noise of a touch panel, in accordance with aspects of the disclosure.

FIG. 6 is a block diagram illustrating the path of the noise signal in a system 600 to suppress noise of a touch panel, in accordance with aspects of the disclosure. Components of FIG. 1-5 are used to help describe aspects of FIG. 6. It can be noted that any unlabeled components may be similar to their labelled counterparts in previous Figures.

In FIG. 6, the noise signal 126 of noise source 112 is shown propagating through system 600. Signal waveforms 644A-644E (generally referred to as "signal waveform(s) 644" herein) show noise signal 126 or noise components thereof at different nodes (e.g., nodes A-E) in system 600. It can be noted that the signal waveforms are provided for illustration, rather than limitation. Other signal waveform may be present in different applications.

At node A, the noise signal 126 is shown as series of triangular waveforms as illustrated by signal waveform 644A. Noise signal 126 propagates from node A to node B via a coupling capacitance 336 between the shield layer 108 and noise source 112.

From node A to node B, the noise signal 126 changes shape (e.g., phase change) as illustrated by signal waveform 644B. The shape change may be caused by coupling capacitance 336 between the shield layer 108 and noise source 112. From node B, the noise signal 126 propagates to both node C and node D.

From node B to node C, the noise signal 126 is slightly attenuated by the resistance of shield layer 108 as shown by signal waveform 644C.

From node B to node D, the noise signal 126 (e.g. first noise component 232A of the noise signal 126) is coupled to the Rx electrode of the electrode layer 106 via a coupling capacitance 334 between the Rx electrode of the electrode layer 106 and the shield layer 108. From node B to D, the noise signal 126 undergoes another transition (e.g., phase change) as illustrated by signal waveform 644D.

From node C to node E, the inclusion of capacitor 541 shapes the noise signal 126 at node E (e.g., second noise component 232B of noise signal 126) to be similar in shape as the noise signal 126 at node D (as illustrated by signal waveform 644E and 644D). The second noise component 232B noise signal 126 having the shape of signal waveform 644E can be attenuated by a particular attenuation coefficient at attenuator 230, and can be subtracted from the first noise component 232A of noise signal 126 having the shape of signal waveform 644D.

Figure 7:
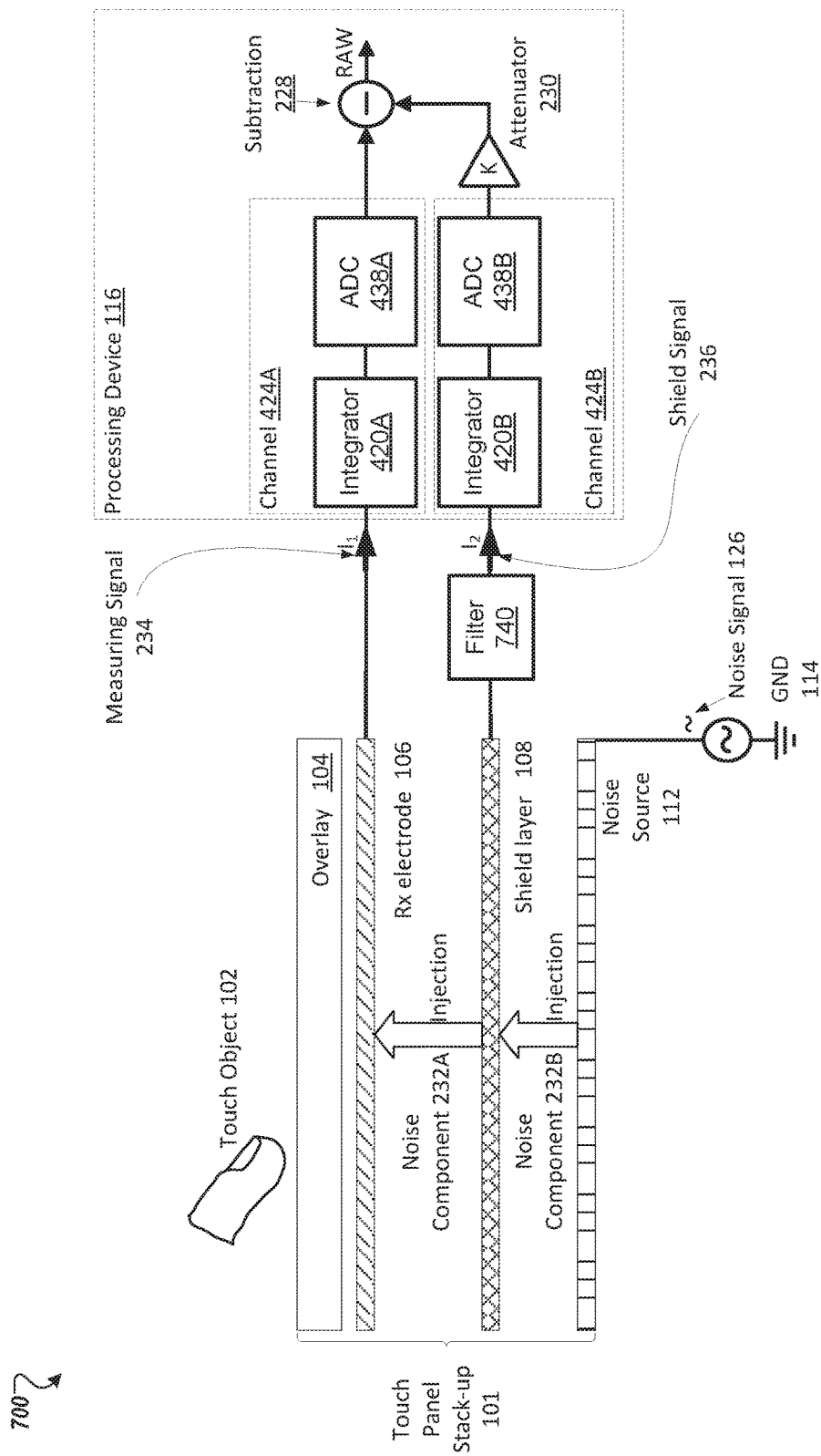
FIG. 7 is a block diagram illustrating a system to suppress noise of a touch panel with a filter in an alternative circuit implementation, in accordance with aspects of the disclosure

FIG. 7 is a block diagram illustrating a system 700 to suppress noise of a touch panel with a filter in an alternative circuit implementation, in accordance with aspects of the disclosure. Components of FIG. 1-6 are used to help describe aspects of FIG. 7. It can be noted that any unlabeled components may be similar to their labelled counterparts in previous Figures. Components of FIG. 7 may be similar to components of FIG. 4. A filter 740 may be included and be similar to filter 540 of FIG. 5.

Figure 8:
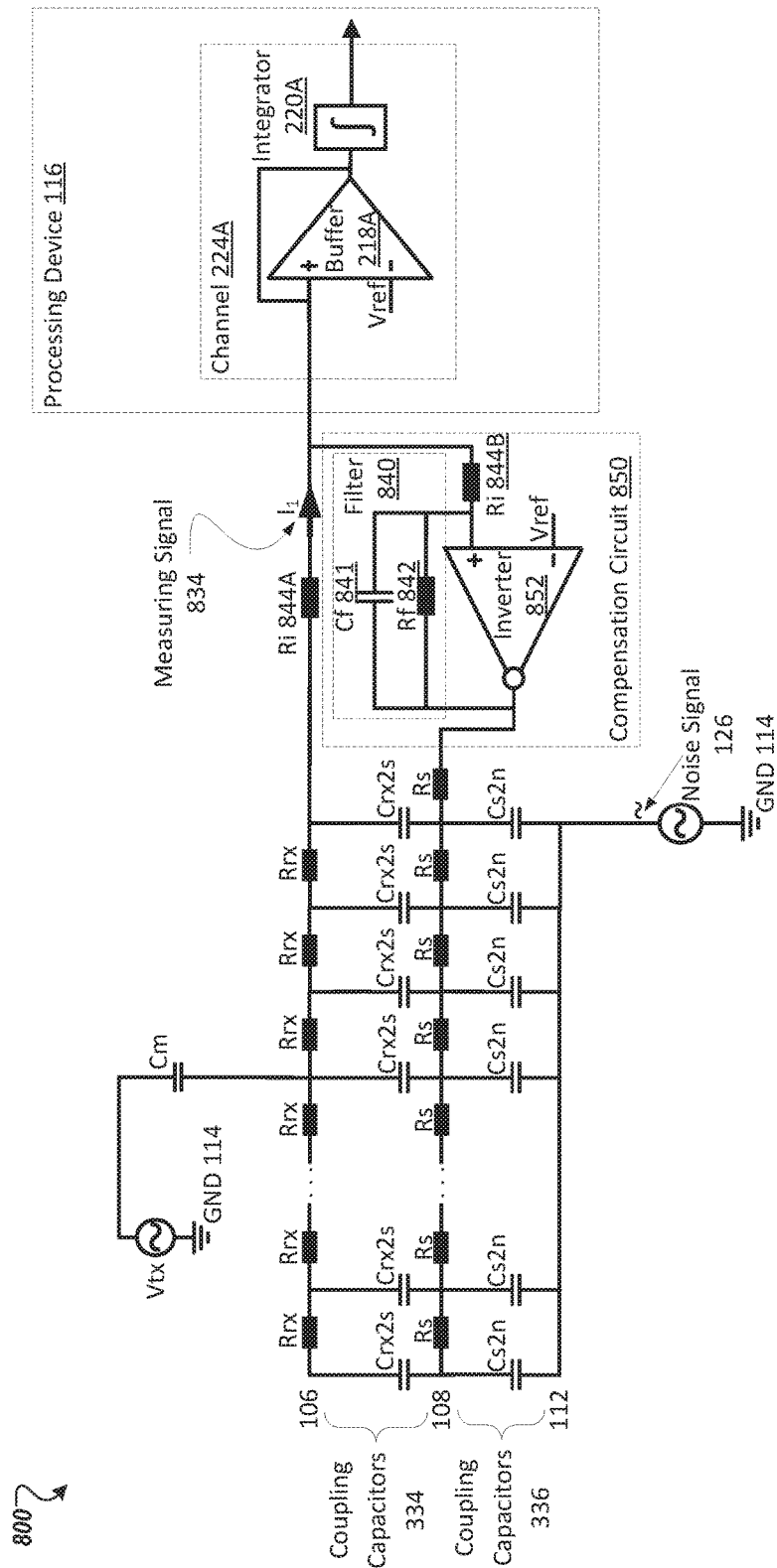
FIG. 8 is a block diagram illustrating a system to suppress noise of a touch panel with an alternative hardware circuit implementation, in accordance with aspects of the disclosure.

FIG. 8 is a block diagram illustrating a system 700 to suppress noise of a touch panel with an alternative hardware circuit implementation, in accordance with aspects of the disclosure. Components of FIG. 1-7 are used to help describe aspects of FIG. 8. It can be noted that any unlabeled components may be similar to their labelled counterparts in previous Figures.

In an embodiment, a compensation circuit 850 can be used to minimize the noise injected into a channel, such as channel 224A of processing device 116. In an embodiment, the compensation circuit 850 can sample the first noise component 232A at the input of buffer 218A. The compensation circuit 850 may filter the first noise component 232A using filter 840, and invert the filtered first noise component 232A using invertor 852, and inject the inverted first noise component 232A into the shield layer 108 using invertor 852, which may reduce the noise component received at the channel 224A.

In an embodiment, one or more components of compensation circuit 850 are off-chip components outside the processing device 116 (as illustrated). In another embodiment, one or more components of compensation circuit 850 are on-chip components of the processing device 116. In an embodiment, the compensation circuit 850 includes circuit hardware components. It can be noted that compensation circuit 850 may include the same, more, less, or different components configured in the same or different configuration in some embodiments.

Figure 9:
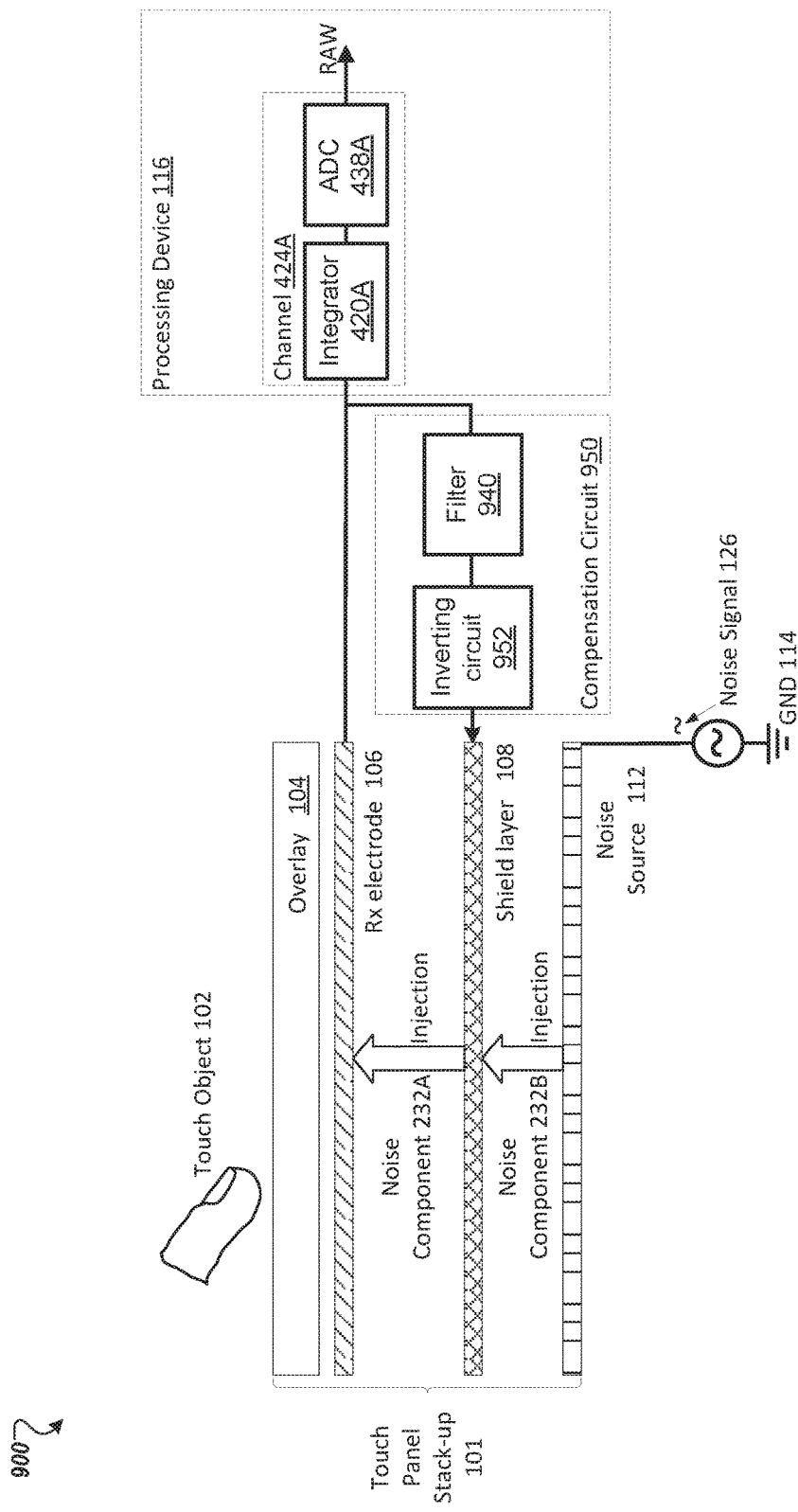
FIG. 9 is a block diagram illustrating a system to suppress noise of a touch panel with another alternative circuit implementation, in accordance with aspects of the disclosure.

FIG. 9 is a block diagram illustrating a system 900 to suppress noise of a touch panel with another alternative circuit implementation, in accordance with aspects of the disclosure. Components of FIG. 1-8 are used to help describe aspects of FIG. 9. It can be noted that any unlabeled components may be similar to their labelled counterparts in previous Figures. System 900 of FIG. 9 is similar to system 400 and system 700 of FIG. 4 and FIG. 7, respectively.

In an embodiment, system implements a compensation circuit 950. Compensation circuit 950 performs operations similar to compensation circuit 850 of FIG. 8. In an embodiment, a compensation circuit 950 can be used to minimize the noise injected into a channel, such as channel 224A of processing device 116. In an embodiment, the compensation circuit 950 can sample the first noise component 232A at the input of buffer 218A. The compensation circuit 850 may filter the first noise component 232A using filter 940, invert the filtered first noise component 232A using an invertor 952, and inject the inverted first noise component 232A into the shield layer 108, which may reduce the noise signal received at channel 224A.

Figure 10:
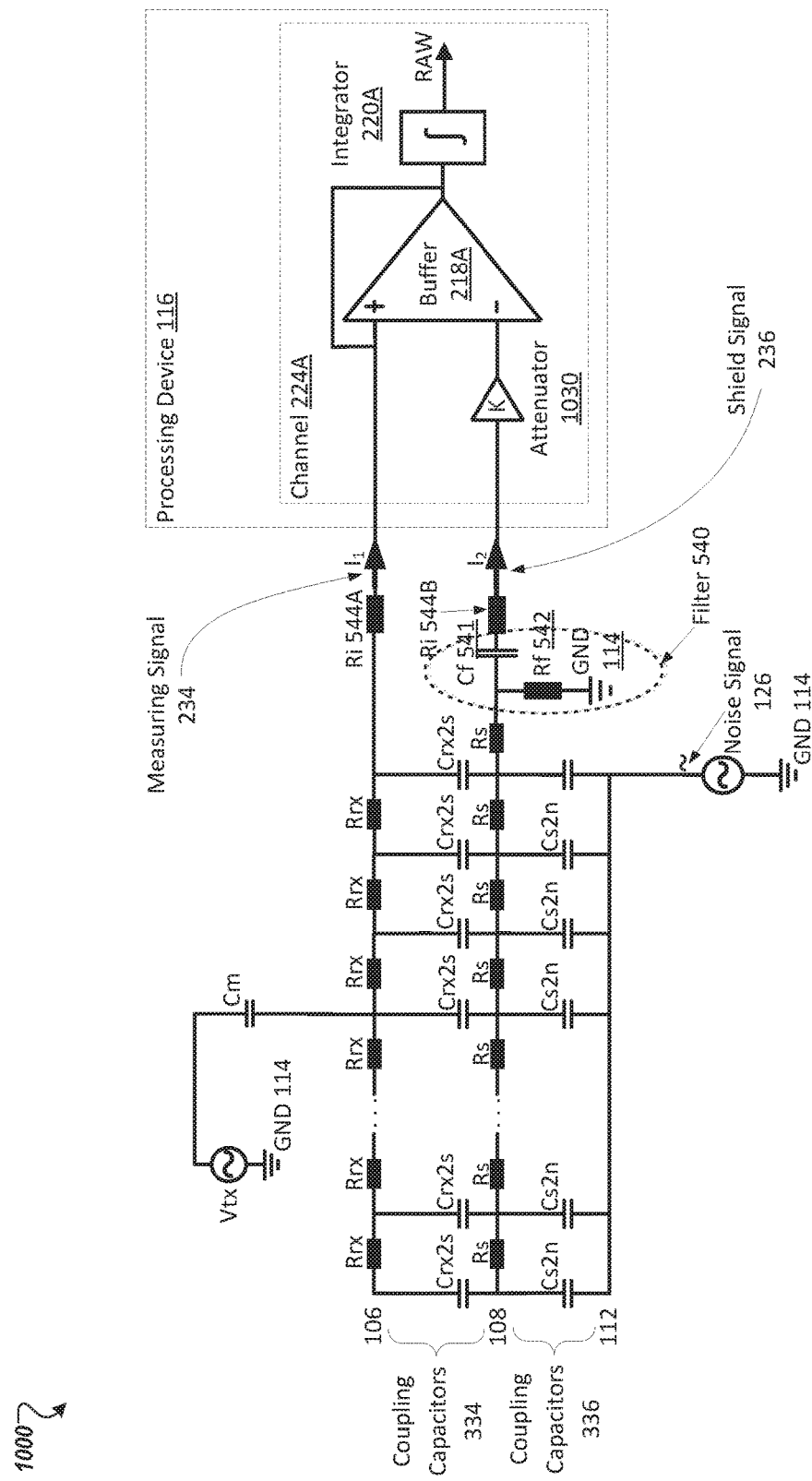
FIG. 10 is a block diagram illustrating a system to suppress noise of a touch panel with an alternative circuit implementation, in accordance with aspects of the disclosure.

In an embodiment, one or more components of compensation circuit 950 are off-chip components outside the processing device 116 (as illustrated). In another embodiment, one or more components of compensation circuit 950 are on-chip components of the processing device 116. It can be noted that compensation circuit 950 may include the same, more, less, or different components configured in the same or different configuration in some embodiments. In embodiments one or more components of compensation circuit may be implemented in hardware, firmware, or a combination thereof FIG. 10 is a block diagram illustrating a system 1000 to suppress noise of a touch panel with an alternative circuit implementation, in accordance with aspects of the disclosure. Components of FIG. 1-9 are used to help describe aspects of FIG. 10. It can be noted that any unlabeled components may be similar to their labelled counterparts in previous Figures.

In system 1000, the noise suppression may be performed at a single channel, such as channel 224A. For example, the measuring signal 234 having a first noise component 232A may be provided at a first input of buffer 218A. The shield signal 236 may be filtered by filter 540 and attenuated by attenuator 1030. The attenuated shield signal 236 is provided to a second input of buffer 218A, which may allow the buffer 218A to effectively filter the first noise component 232A (e.g., common-mode rejection) from measuring signal 234. The buffered measuring signal 234 is then integrated at integrator 220.

In an embodiment, attenuator 1030 is a hardware integrator and integrated into channel 224A of processing device.

Figure 11:
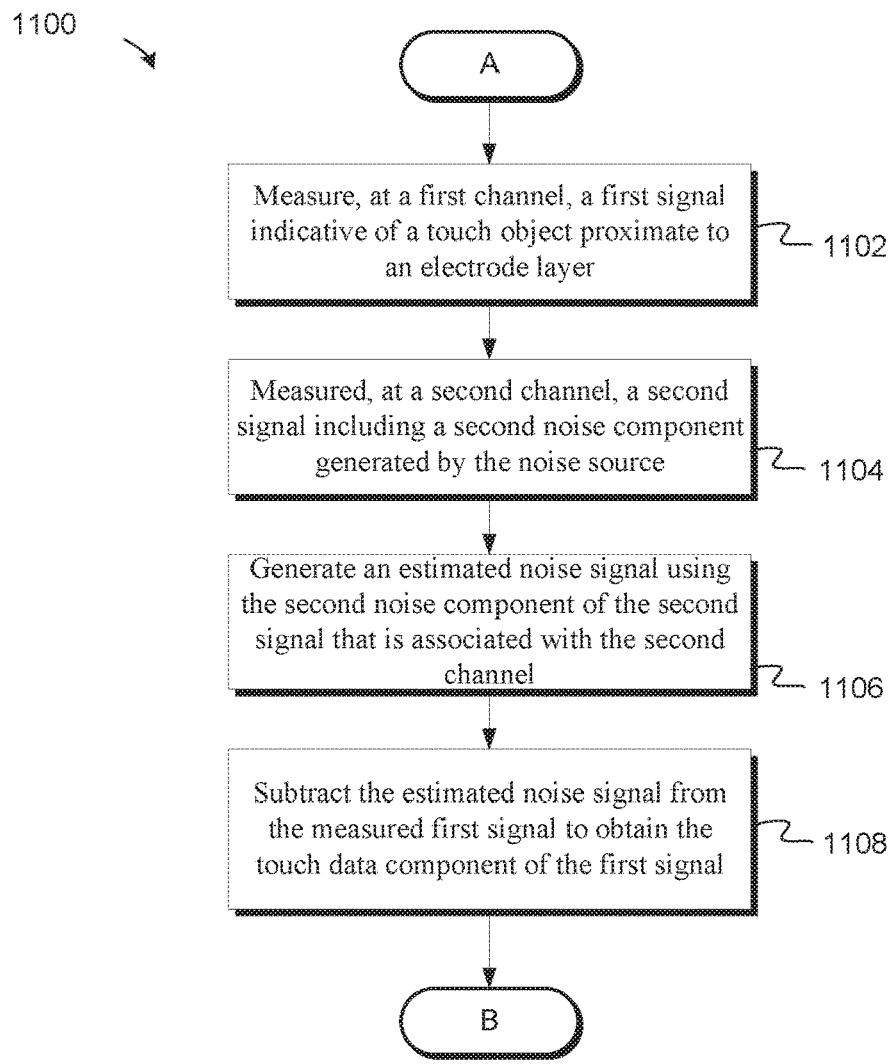
FIG. 11 is a flow diagram illustrating method for suppressing a noise signal from a touch panel, in accordance with aspects of the disclosure.

FIG. 11 is a flow diagram illustrating method 1100 for suppressing a noise signal from a touch panel, in accordance with aspects of the disclosure. Method 1100 may be performed by processing logic that includes hardware (e.g., circuitry, dedicated logic, programmable logic, microcode), software (e.g., instructions run on a processing device to perform hardware simulation), or a combination thereof. In other implementations, noise suppression module 1320 of FIG. 13 can perform some or all the operations. Components of the preceding Figures may be used to help illustrate method 1100. It may be noted that the in some implementations, method 1100 may include the same, different, fewer, or greater number of operations performed in any order.

At block 1102, processing logic measures, at channel 224A of a processing device 116, a first signal (e.g., measuring signal 234) indicative of a touch object proximate to an electrode layer 106. The first signal includes a touch data component and a first noise component 232A generated by a noise source 112.

In an embodiment, measuring the first signal includes buffering the first signal using buffer 218A of channel 224A and integrating the buffered first signal using an integrator 220A.

In another embodiment, measuring the first signal includes integrating the first signal using integrator 420A and converting the first signal into a digital signal using ADC 438A.

At block 1104, processing logic measures, at channel 224B of the processing device 116, a second signal (e.g., shield signal 236) including a second noise component 232B generated by the noise source 112. The channel 224B is coupled to shield layer 108 that is disposed between the noise source 112 and electrode layer 106.

In an embodiment, measuring the second signal includes buffering the second signal using buffer 218B of channel 224B and integrating the buffered second signal using an integrator 220B.

In another embodiment, measuring the second signal includes integrating the second signal using integrator 420B and converting the second signal into a digital signal using ADC 438B.

In an embodiment, the measuring the first signal at channel 224A is performed concurrently with measuring the second signal at channel 224B.

At block 1106, processing logic generates an estimated noise signal using the second noise component 232B of the second signal that is associated with the channel 224B. The estimated noise signal is an estimation of the first noise component 232A of the first signal.

In an embodiment, generating the estimated noise signal includes attenuating the second signal (e.g., shield signal 236) by an attenuation coefficient to generate the estimated noise signal. For example, after the second signal is measured (e.g., buffered and integrated), the second signal can be attenuated by attenuator 230.

At block 1108, processing logic may subtract the estimated noise signal from the measured first signal to obtain the touch data component of the first signal. For example, a subtraction module 228 may be used to subtract the estimated noise signal from the measured first signal. In an embodiment, the touch data may be used to determine whether a touch by a touch object 102 occurred proximate to an Rx electrode of the electrode layer 106.

As noted above, similar operations may be used for other channels associated with other Rx electrodes of electrode layer 106. In embodiments, channel 224A may be used to suppress noise for one or more channels associated with Rx electrodes.

Figure 12:
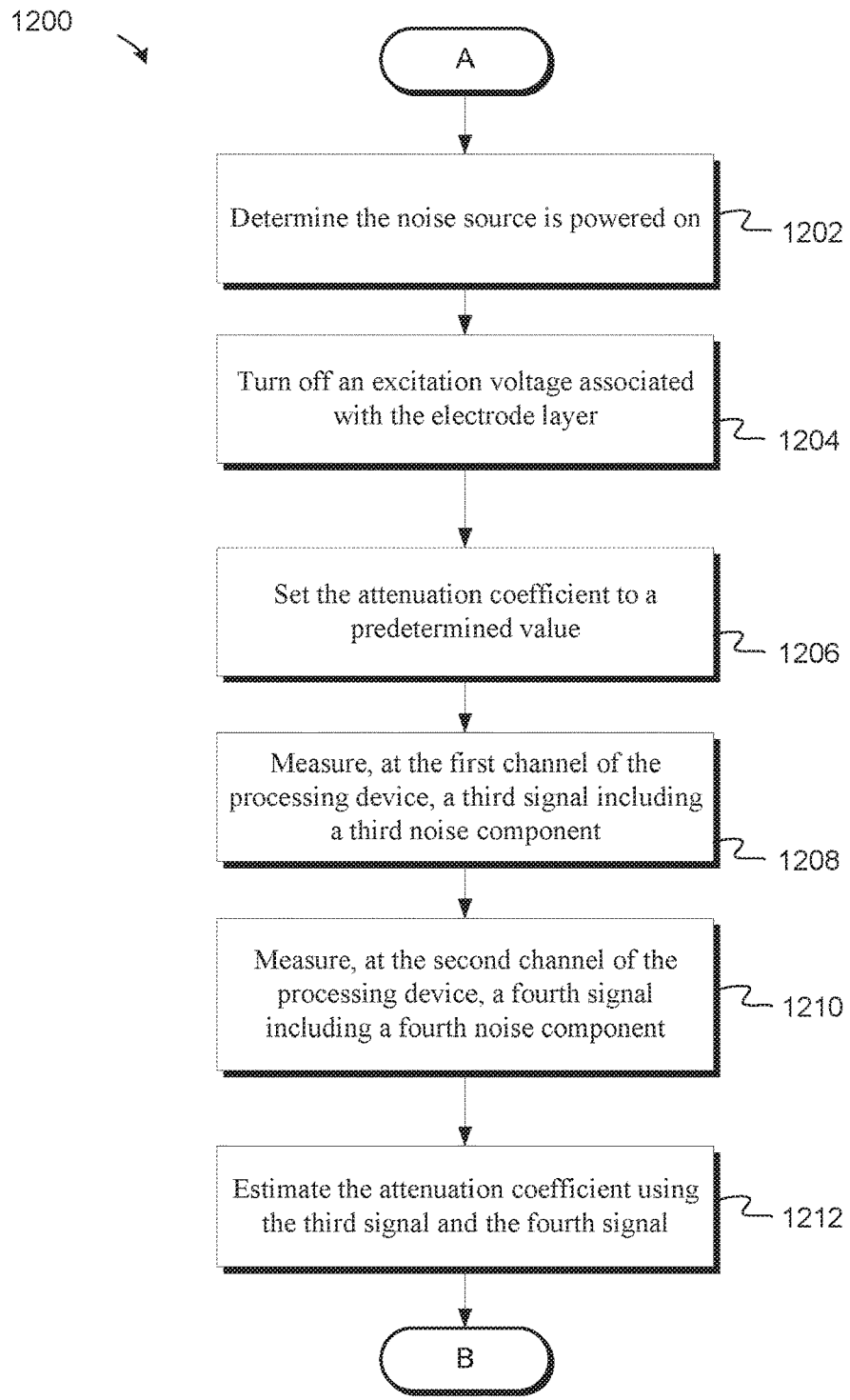
FIG. 12 is a flow diagram illustrating method for determining an attenuation coefficient used to generate the estimated noise signal, in accordance with aspects of the disclosure.

FIG. 12 is a flow diagram illustrating method 1200 for determining an attenuation coefficient used to generate the estimated noise signal, in accordance with aspects of the disclosure. Method 1200 may be performed by processing logic that includes hardware (e.g., circuitry, dedicated logic, programmable logic, microcode), software (e.g., instructions run on a processing device to perform hardware simulation), or a combination thereof. In other implementations, noise suppression module 1320 of FIG. 13 can perform some or all the operations. Components of the preceding Figures may be used to help illustrate method 1200. It may be noted that the in some implementations, method 1200 may include the same, different, fewer, or greater number of operations performed in any order.

At block 1202, processing logic determines that the noise source 112 is powered on. For example, the processing device 116 may send a signal that turns the display device on. In another example, the processing device 116 received an indication that the display device is powered on, but may not directly control the display device.

At block 1204, processing logic may turn off one or more excitation voltages associated with the electrode layer 106. For example, in mutual capacitance sensing the Tx excitation voltages may be removed. In another example, in self-capacitance sensing the excitation voltage may be turned off by, for instance, coupling the device ground of the processing device 116 to the system ground used by the noise source 112. In an embodiment, the excitation voltages are turned off so that a touch does not interfere with measurements of the noise signal 126 at both channel 224A and channel 224B of processing device 116.

At block 1206, processing logic sets the attenuation coefficient to a predetermined number. For example, the attenuation coefficient of attenuator 230 may be set to the 1, so that the attenuator 230 buffers the second noise component (I2) 232B of the noise source 112.

At block 1208, processing logic measures, at the channel 224A of processing device 116, the third signal including the third noise component (e.g., similar to first noise component 232A). In an embodiment, the measurement of the third signal may be similar to measurement of the first signal (e.g., measuring signal 234) as described above except that the third signal does not include a touch data component because the excitation signal is turned off.

At block 1208, processing logic measures at the channel 224B of processing device 116, the fourth signal including the fourth noise component (e.g., similar to second noise component 232B). In an embodiment, the measurement of the fourth signal may be similar to measurement of the second signal (e.g., shield signal 236) as described above.

In an embodiment, the third signal and the fourth signal are measured concurrently.

At block 1210, processing logic estimates the attenuation coefficient using the third signal and fourth signal from channel 224A and channel 224B, respectively. For example, the third signal represents the noise component (e.g., first noise component 232A) of the noise source 112 received by the channel 224A. The fourth signal represents the noise component (e.g., second noise component 232B) of the noise source 112 received by the channel 224B. Since the excitation signal is turned off, the signals received by channel 224A and channel 224B may be representative of the noise source 112 without interference from signals representative of touch data.

In one embodiment, the attenuation coefficient may be estimated using a ratio of the third signal (e.g., first noise component 232A) received at channel 224A and the fourth signal (e.g., second noise component 232B) received at channel 224B. In another embodiment, the attenuation coefficient can be estimated using a least square method approach using the third signal and the fourth signal.

In an embodiment, the attenuator, such as attenuator 230 or attenuator 1030, may be set using the estimated attenuation coefficient.

In an embodiment, determining the attenuation coefficient can be performed once, for example, after manufacture of the system (e.g., mobile device). In another embodiment, determining the attenuation coefficient may be performed more than once, for example periodically based on time, number of on-off cycles of the system, or other criteria. In an embodiment, determining the attenuation coefficient can be performed dynamically, for example when a user is using the system.

In another embodiment, the attenuation coefficient can be determined based on a temperature value sensed in the system. In an embodiment, processing logic determines that a temperature value satisfies a temperature threshold. Responsive to determining that a temperature value satisfies a temperature threshold, processing logic determines the attenuation coefficient used to generate the estimated noise signal. For example, processing device 116 may receive or generate a temperature value indicative of the temperature of the electrode layer 106 or shield layer 108. The temperature value may exceed a predefined threshold or drop below another predefined threshold, responsive to which processing device 116 executes method 1200 to determine a new attenuation coefficient.

Figure 13:
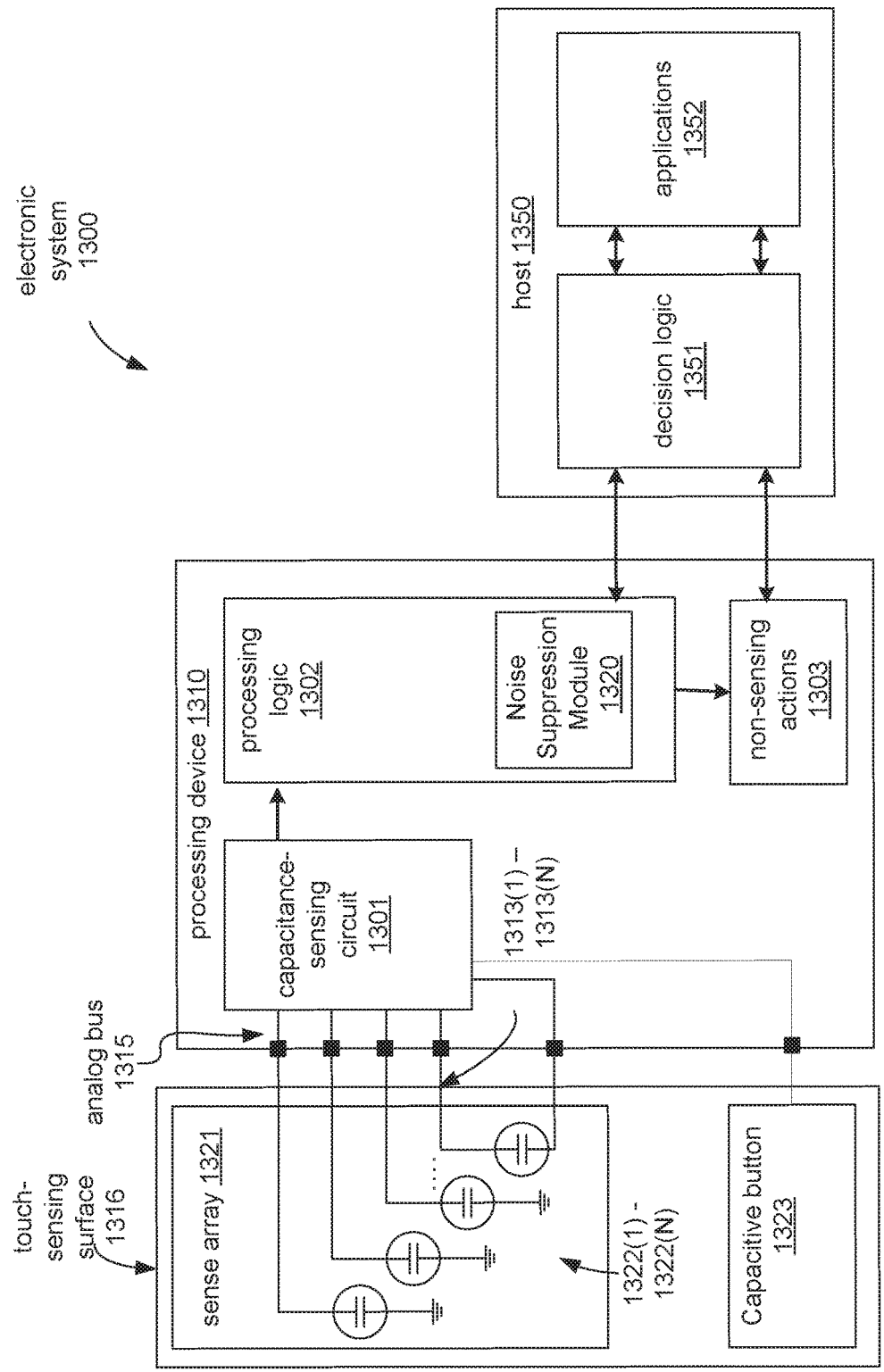
FIG. 13 is a block diagram illustrating an electronic system that processes touch data, in accordance with aspects of the disclosure.

FIG. 13 is a block diagram illustrating an electronic system that processes touch data, in accordance with aspects of the disclosure. FIG. 13 illustrates an electronic system 1300 including a processing device 1310 (which may be similar to processing device 116 described herein) that may be configured to measure capacitances from a sense array 1321 (e.g., capacitive-sense array) with noise suppression module 1320, the sensor array 1321 forming a touch-sensing surface 1316. In one embodiment, a multiplexer circuit may be used to connect a capacitance-sensing circuit 1301 with a sense array 1321. The touch-sensing surface 1316 (e.g., a touchscreen or a touch pad) is coupled to the processing device 1310, which is coupled to a host 1350. In one embodiment, the touch-sensing surface 1316 is a two-dimensional sense array (e.g., sense array 1321) that uses processing device 1310 to detect touches on the touch-sensing surface 1316.

In one embodiment, the sense array 1321 includes electrodes 1322(1)-1322(N) (where N is a positive integer) that are disposed as a two-dimensional matrix (also referred to as an XY matrix). The sense array 1321 is coupled to pins 1313(1)-1313(N) of the processing device 1310 via one or more analog buses 1315 transporting multiple signals. In sense array 1321, the first three electrodes (i.e., electrodes 1322(1)-(3)) are connected to capacitance-sensing circuit 1301 and to ground, illustrating a self-capacitance configuration. The last electrode (i.e., 1322(N)) has both terminals connected to capacitance-sensing circuit 1301, illustrating a mutual capacitance configuration. It should be noted that the other electrodes 1322 can have both terminals connected to capacitance-sensing circuit 1301 as well. In an alternative embodiment without an analog bus, each pin may instead be connected either to a circuit that generates a transmit or transmission (TX) signal or to an individual receive (RX) sensor circuit. The sense array 1321 may include a multi-dimension capacitive sense array. The multi-dimension sense array includes multiple sense elements, organized as rows and columns. In another embodiment, the sense array 1321 operates as an all-points-addressable ("APA") mutual capacitive sense array. The sense array 1321 may be disposed to have a flat surface profile. Alternatively, the sense array 1321 may have non-flat surface profiles. Alternatively, other configurations of capacitive sense arrays may be used. For example, instead of vertical columns and horizontal rows, the sense array 1321 may have a hexagon arrangement, or the like. In one embodiment, the sense array 1321 may be included in an indium tin oxide (ITO) panel or a touch screen panel. In one embodiment, sense array 1321 is a capacitive sense array. In another embodiment, the sense array 1321 is non-transparent capacitive sense array (e.g., PC touchpad). In one embodiment, the sense array is configured so that processing device 1310 may generate touch data for a touch detected proximate to the capacitive sense array, the touch data represented as a plurality of cells.

In one embodiment, the capacitance-sensing circuit 1301 may include a CDC or other means to convert a capacitance into a measured value. The capacitance-sensing circuit 1301 may also include a counter or timer to measure the oscillator output. The processing device 1310 may further include software components to convert the count value (e.g., capacitance value) into a touch detection decision or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance-sensing circuit 1301 may be evaluating other measurements to determine the user interaction. For example, in the capacitance-sensing circuit 1301 having a sigma-delta modulator, the capacitance-sensing circuit 1301 is evaluating the ratio of pulse widths of the output (i.e., density domain), instead of the raw counts being over or under a certain threshold.

In another embodiment, the capacitance-sensing circuit 1301 includes a TX signal generator to generate a TX signal (e.g., stimulus signal) to be applied to the TX electrode and a receiver (also referred to as a "sensing channel" or "receiving (Rx) channel" or "channel"), such as a buffer or an integrator, to measure an RX signal on the RX electrode. In some embodiments, each Rx channel may be coupled to a physical pin of processing device 1310 (or capacitance-sensing circuit 1301). In some embodiments, each Rx channel may include hardware such as a buffer or an integrator. In a further embodiment, the capacitance-sensing circuit 1301 includes an analog-to-digital converter (ADC) coupled to an output of the receiver to convert the measured RX signal to a digital value. The digital value can be further processed by the processing device 1310, the host 1350, or both.

The processing device 1310 is configured to detect one or more touches on a touch-sensing device, such as the sense array 1321. The processing device can detect conductive objects, such as touch objects (fingers or passive styluses, an active stylus, or any combination thereof). The capacitance-sensing circuit 1301 can measure a touch data on the sense array 1321. The touch data may be represented as multiple cells, each cell representing an intersection of sense elements (e.g., electrodes) of the sense array 1321. The capacitive sense elements are electrodes of conductive material, such as copper, silver, indium tin oxide (ITO), metal mesh, carbon nanotubes, or the like. The sense elements may also be part of an ITO panel. The capacitive sense elements can be used to allow the capacitance-sensing circuit 1301 to measure self-capacitance, mutual capacitance, or any combination thereof. In another embodiment, the touch data measured by the capacitance-sensing circuit 1301 can be processed by the processing device 1310 to generate a 2D capacitive image of the sense array 1321 (e.g., capacitive-sense array). In one embodiment, when the capacitance-sensing circuit 1301 measures mutual capacitance of the touch-sensing device (e.g., capacitive-sense array), the capacitance-sensing circuit 1301 determines a 2D capacitive image of the touch-sensing object on the touch surface and processes the data for peaks and positional information. In another embodiment, the processing device 1310 is a microcontroller that obtains a capacitance touch signal data set, such as from a sense array, and finger detection firmware executing on the microcontroller identifies data set areas that indicate touches, detects and processes peaks, calculates the coordinates, or any combination therefore. The firmware can calculate a precise coordinate for the resulting peaks. In one embodiment, the firmware can calculate the precise coordinates for the resulting peaks using a centroid algorithm, which calculates a centroid of the touch, the centroid being a center of mass of the touch. The centroid may be an X/Y coordinate of the touch. Alternatively, other coordinate interpolation algorithms may be used to determine the coordinates of the resulting peaks. The microcontroller can report the precise coordinates to a host processor, as well as other information.

In one embodiment, the processing device 1310 further includes processing logic 1302. Some or all of the operations of the processing logic 1302 may be implemented in firmware, hardware, or software or some combination thereof. The processing logic 1302 may receive signals from the capacitance-sensing circuit 1301, and determine the state of the sense array 1321, such as whether an object (e.g., a finger) is detected on or in proximity to the sense array 1321 (e.g., determining the presence of the object), resolve where the object is on the sense array (e.g., determining the location of the object), tracking the motion of the object, or other information related to an object detected at the touch sensor. In another embodiment, processing logic 1302 may include capacitance-sensing circuit 1301.

The processing logic 1302 can be implemented in a capacitive touch screen controller. In one embodiment, the capacitive touch screen controller is the TrueTouch® capacitive controllers and CapSense® technology controllers (touch screens, buttons, sliders, proximity, etc.), such as the CY8C[2|3|4|5|6]xxxx family and CY8CMBRxx family of CapSense controllers, developed by Cypress Semiconductor Corporation of San Jose, Calif. The CapSense® technology can be delivered as a peripheral function in the Programmable System on a Chip (PSoC®) processing device, developed by Cypress Semiconductor Corporation, San Jose, Calif., such as the PSoC® 1, 3, 4, 5, 6 devices. The CapSense® controllers' sensing technology can resolve touch locations of multiple fingers and a stylus on the touch-screens, supports operating systems, and is optimized for low-power multi-touch gesture and all-point touchscreen functionality. Alternatively, the touch position calculation features may be implemented in other touchscreen controllers, or other touch controllers of touch-sensing devices. In one embodiment, the touch position calculation features may be implemented with other touch filtering algorithms as would be appreciated by one of ordinary skill in the art having the benefit of this disclosure.

In another embodiment, instead of performing the operations of the processing logic 1302 in the processing device 1310, the processing device 1310 may send the raw data or partially-processed data to the host 1350. The host 1350, as illustrated in FIG. 13, may include decision logic 1351 that performs some or all of the operations of the processing logic 1302. Noise suppression module 1320 may be implemented partially or fully by decision logic 1351. Noise suppression module 1320 may be a module within decision logic 1351. Alternatively, noise suppression module 1320 may be an algorithm in decision logic 1351. Host 1350 may obtain raw capacitance data from processing device 1310, and determine if a touch has occurred or not occurred on sense array 1321. Operations of the decision logic 1351 may be implemented in firmware, hardware, software, or a combination thereof. The host 1350 may include a high-level Application Programming Interface (API) in applications 1352 that perform routines on the received data, such as compensating for sensitivity differences, other compensation algorithms, baseline update routines, start-up and/or initialization routines, interpolation operations, or scaling operations. The operations described with respect to the processing logic 1302 may be implemented in the decision logic 1351, the applications 1352, or in other hardware, software, and/or firmware external to the processing device 1310. In some other embodiments, the processing device 1310 is the host 1350.

In another embodiment, the processing device 1310 may also include a non-sensing actions block 1303. Non-sensing actions block 1303 may be used to process and/or receive/ transmit data to and from the host 1350. For example, additional components may be implemented to operate with the processing device 1310 along with the sense array 1321 (e.g., keyboard, keypad, mouse, trackball, LEDs, displays, or other peripheral devices).

As illustrated, capacitance-sensing circuit 1301 may be integrated into processing device 1310. Capacitance-sensing circuit 1301 may include an analog I/O for coupling to an external component, such as touch-sensor pad (not shown), sense array 1321, touch-sensor slider (not shown), touch-sensor buttons (not shown), and/or other devices. The capacitance-sensing circuit 1301 may be configurable to measure capacitance using mutual-capacitance sensing techniques, self-capacitance sensing technique, charge coupling techniques, combinations thereof, or the like. In one embodiment, capacitance-sensing circuit 1301 operates using a charge accumulation circuit, a capacitance modulation circuit, or other capacitance sensing methods known by those skilled in the art. In an embodiment, the capacitance-sensing circuit 1301 is of the Cypress controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 1301 in any chosen combination. In one embodiment, the TX and RX electrodes of the sense array 1321 are configurable to operate as TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of an RX electrode and a TX electrode (including one or more sense element) as done during mutual-capacitance sensing. An intersection between two sense elements may be understood as a location at which one sense electrode crosses over or overlaps another, while maintaining galvanic isolation from each other. The capacitance associated with the intersection between a TX electrode and an RX electrode can be sensed by selecting every available combination of TX electrode and RX electrode. When a touch object (i.e., conductive object), such as a finger or stylus, approaches the sense array 1321, the touch object causes a decrease in mutual capacitance between some of the TX/RX electrodes. In another embodiment, the presence of a finger increases the coupling capacitance of the electrodes. Thus, the location of the finger on the sense array 1321 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art. In addition, various types of coordinate interpolation algorithms may be used to detect the center of the touch as would be appreciated by one of ordinary skill in the art.

It should also be noted that the embodiments described herein are not limited to having a configuration of a processing device coupled to a host, but may include a system that measures the capacitance on the sensing device and sends the raw data to a host computer where it is analyzed by an application. In another embodiment, the processing that is done by processing device 1310 is done in the host.

The processing device 1310 may reside on a common carrier substrate such as, for example, an integrated circuit (IC) die substrate, or a multi-chip module substrate. Alternatively, the components of the processing device 1310 may be one or more separate integrated circuits and/or discrete components. In one embodiment, the processing device 1310 may be the Programmable System on a Chip (PSoC®) processing device, developed by Cypress Semiconductor Corporation, San Jose, Calif. One embodiment of the PSoC® processing device is illustrated and described below with respect to FIG. 14. Alternatively, the processing device 1310 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 1310 may be a network processor having multiple processors including a core unit and multiple micro-engines. Additionally, the processing device 1310 may include any combination of general-purpose processing device(s) and special-purpose processing device(s).

Capacitance-sensing circuit 1301 may be integrated into the IC of the processing device 1310, or alternatively, in a separate IC. Alternatively, descriptions of capacitance-sensing circuit 1301 may be generated and compiled for incorporation into other integrated circuits. For example, behavioral level code describing the capacitance-sensing circuit 1301, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 1301.

It should be noted that the components of electronic system 1300 may include all the components described above. Alternatively, electronic system 1300 may include some of the components described above.

In one embodiment, the electronic system 1300 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel, among others. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Electronic system 1300 includes capacitive button 1323. Capacitive button 1323 is connected to processing device 1310. In one embodiment, capacitive button 1323 may be a single electrode. In another embodiment, capacitive button 1323 may be a pair of electrodes. In one embodiment, capacitive button 1323 is disposed on a substrate. In one embodiment, capacitive button 1323 may be part of sense array 1321. In another embodiment, capacitive button may be a separate from sense array 1321. In one embodiment, capacitive button 1323 may be used to in self-capacitance scan mode. In another embodiment, capacitive button 1323 may be used in mutual capacitance scan mode. In one embodiment, capacitive button 1323 may be used in both self-capacitance scan mode and mutual capacitance scan mode. Alternatively, the capacitive button 1323 is used in a multi-stage capacitance measurement process as described herein. Capacitive button 1323 may be one or more distinct buttons.

Figure 14:
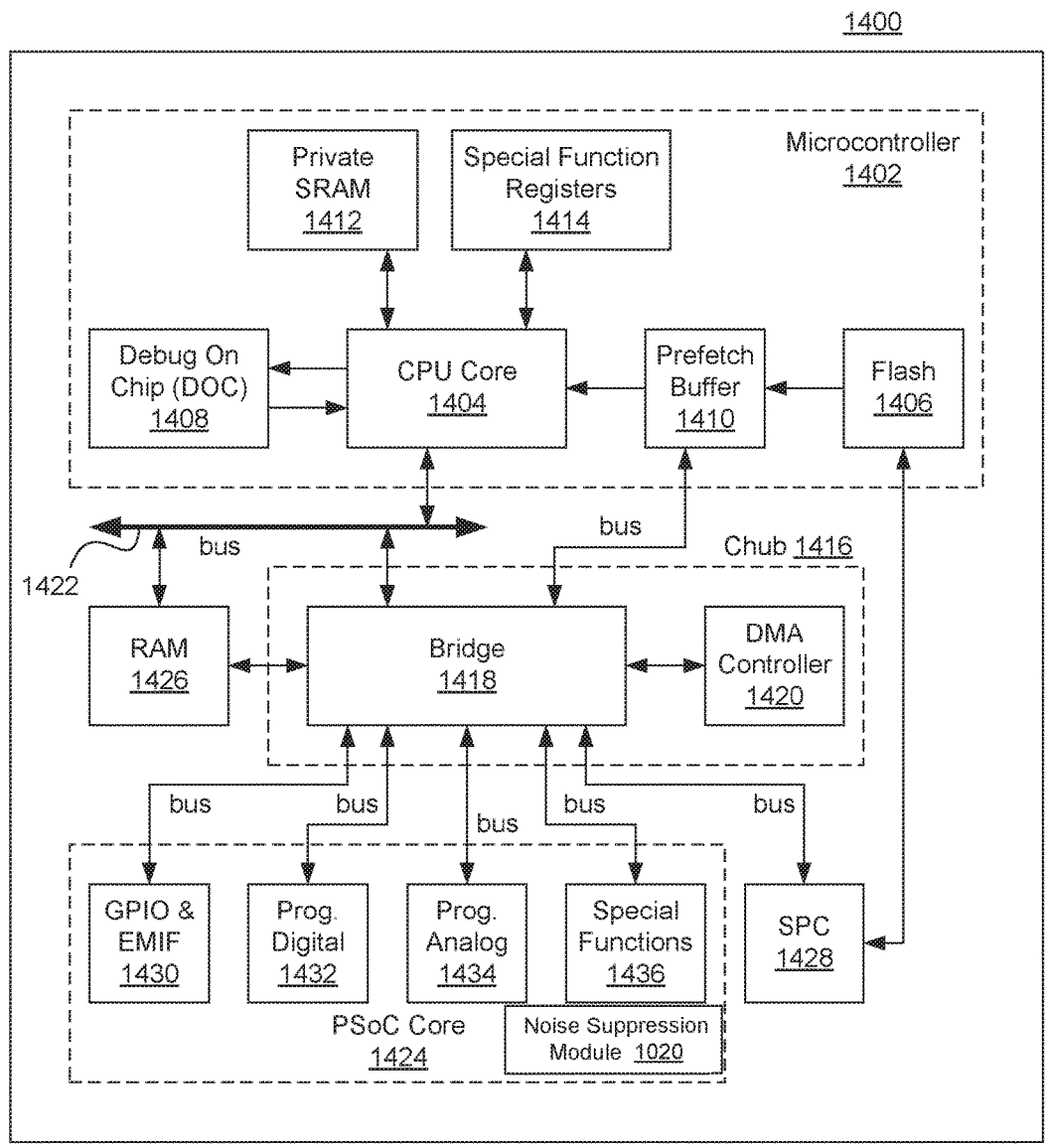
FIG. 14 illustrates an embodiment of a core architecture of the Programmable System-on-Chip (PSoC®) processing device, in accordance with aspects of the disclosure.

FIG. 14 illustrates an embodiment of a core architecture 1400 of the PSoC® processing device, such as that used in the PSoC3® family of products offered by Cypress Semiconductor Corporation (San Jose, Calif.). In one embodiment, the core architecture 1400 includes a microcontroller 1402. The microcontroller 1402 includes a CPU (central processing unit) core 1404, flash program storage 1406, DOC (debug on chip) 1408, a prefetch buffer 1410, a private SRAM (static random access memory) 1412, and special functions registers 1414. In an embodiment, the DOC 1408, prefetch buffer 1410, private SRAM 1412, and special function registers 1414 are coupled to the CPU core 1404, while the flash program storage 1406 is coupled to the prefetch buffer 1410.

The core architecture 1400 may also include a CHub (core hub) 1416, including a bridge 1418 and a direct memory access (DMA) controller 1420 that is coupled to the microcontroller 1402 via bus 1422. The CHub 1416 may provide the primary data and control interface between the microcontroller 1402 and its peripherals (e.g., peripherals) and memory, and a programmable core 1424. The DMA controller 1420 may be programmed to transfer data between system elements without burdening the CPU core 1404. In various embodiments, each of these subcomponents of the microcontroller 1402 and CHub 1416 may be different with each choice or type of CPU core 1404. The CHub 1416 may also be coupled to shared SRAM 1426 and an SPC (system performance controller) 1428. The private SRAM 1412 is independent of the shared SRAM 1426 that is accessed by the microcontroller 1402 through the bridge 1418. The CPU core 1404 accesses the private SRAM 1412 without going through the bridge 1418, thus allowing local register and RAM accesses to occur simultaneously with DMA access to shared SRAM 1426. Although labeled here as SRAM, these memory modules may be any suitable type of a wide variety of (volatile or non-volatile) memory or data storage modules in various other embodiments.

In various embodiments, the programmable core 1424 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 1424 includes a GPIO (general purpose IO) and EMIF (extended memory interface) block 1430 to provide a mechanism to extend the external off-chip access of the microcontroller 1402, a programmable digital block 1432, a programmable analog block 1434, and a special functions block 1436, each configured to implement one or more of the subcomponent functions. In various embodiments, the special functions block 1436 may include dedicated (non-programmable) functional blocks and/or include one or more interfaces to dedicated functional blocks, such as USB, a crystal oscillator drive, JTAG, and the like.

The programmable digital block 1432 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital block 1432 may be configured to perform various digital functions, including, but not limited to, one or more of the following functions: a basic I2C slave; an I2C master; a SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 1404) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× over-sampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 1434 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 1434 may support various analog functions including, but not limited to, analog routing, LCD drive IO support, capacitance-sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

In an embodiment, programmable core 1424 may include noise suppression module 1320 to perform one or more aspects of the disclosure. Some are all of component or operations of noise suppression module 1320 may be performed by one or more of the subcomponents of programmable core 1424. It can be noted that other components of core architecture 1400 may perform some or all of the operations of noise suppression module 1320 or include some or all the components used by noise suppression module 1320.

The embodiments described herein may be used in various designs of mutual-capacitance sensing systems, in self-capacitance sensing systems, or combinations of both. In one embodiment, the capacitance sensing system detects multiple sense elements that are activated in the array and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "generating," "subtracting," "buffering," "integrating," "multiplying," "determining," "causing," "setting," "estimating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the embodiments should, therefore, be determined with reference to the appended claims, along with the full scope of equivalents to which such claims are entitled.

What is claimed is:

1. A method comprising:
   measuring, at a first channel of a processing device, a first signal indicative a touch object proximate to an electrode layer, the first signal comprising a touch data component and a first noise component generated by a noise source;
   measuring, at a second channel of the processing device, a second signal comprising a second noise component generated by the noise source, wherein the second channel is coupled to a shield layer disposed between the noise source and the electrode layer;
   generating an estimated noise signal using the second noise component of the second signal that is associated with the second channel, wherein the estimated noise signal is an estimation of the first noise component of the first signal; and
   subtracting the estimated noise signal from the measured first signal to obtain the touch data component of the first signal.

2. The method of claim 1, wherein measuring the first signal at the first channel is performed concurrently with measuring the second signal at the second channel.

3. The method of claim 1, wherein measuring the first signal indicative of the touch object proximate to the electrode layer comprises:
   buffering the first signal using first buffer of the first channel; and
   integrating the buffered first signal; and
   wherein measuring the second signal comprising the second noise component generated by the noise source comprises:
   buffering the second signal using a second buffer of the second channel; and
   integrating the buffered second signal.

4. The method of claim 1, wherein generating the estimated noise signal using the second noise component of the second signal that is associated with the second channel comprises:
   attenuating the second signal by an attenuation coefficient to generate the estimated noise signal.

5. The method of claim 1, further comprising:
   determining an attenuation coefficient used to generate the estimated noise signal.

6. The method of claim 5, further comprising:
   determining that a temperature value satisfies a temperature threshold, wherein determining the attenuation coefficient used to generate the estimated noise signal is performed responsive to determining that the temperature value satisfies the temperature threshold.

7. The method of claim 5, wherein determining the attenuation coefficient used to generate the estimated noise signal comprises:
   determining that the noise source is powered on;
   setting the attenuation coefficient to a predetermined value;
   measuring, at the first channel of the processing device, a third signal comprising a third noise component;
   measuring, at the second channel of the processing device, a fourth signal comprising a fourth noise component; and
   estimating the attenuation coefficient using the third signal and the fourth signal.

8. The method of claim 1, wherein the noise source generates a noise signal comprising the first noise component and the second noise component.

9. The method of claim 1, wherein the noise source comprises a display device.

10. The method of claim 1, wherein the first channel is coupled to the electrode layer.

11. A processing device, comprising:
    a first channel to measure a first signal indicative of a touch object proximate to an electrode layer, the first signal comprising a touch data component and a first noise component generated by a noise source; and
    a second channel to measure a second signal comprising a second noise component generated by the noise source, wherein the second channel is coupled to a shield layer disposed between the noise source and the electrode layer; and
    wherein the processing device to:
    generate an estimated noise signal using the second noise component of the second signal associated with the second channel, wherein the estimated noise signal is an estimation of the first noise component of the first signal; and
    subtract the estimated noise signal from the measured first signal to obtain the touch data component of the first signal.

12. The processing device of claim 11, wherein the first channel and the second channel to concurrently measure the first signal and the second signal respectively.

13. The processing device of claim 11, wherein to generate the estimated noise signal using the second noise component of the second signal associated with the second channel, the processing device to:
    attenuate the second signal by an attenuation coefficient to generate the estimated noise signal.

14. The processing device of claim 11, the processing device further to determine an attenuation coefficient used to generate the estimated noise signal, wherein to determine the attenuation coefficient the processing device to:
    determine that the noise source is powered on;
    set the attenuation coefficient to a predetermined value;
    measure, at the first channel of the processing device, a third signal comprising a third noise component;

measure, at the second channel of the processing device, a fourth signal comprising a fourth noise component; and estimate the attenuation coefficient using the third signal and the fourth signal.

15. The processing device of claim 11, wherein the noise source comprises a display device.

16. A system, comprising:
a display device to generate a noise signal comprising a first noise component and a second noise component;
a shield layer disposed above the display device;
an electrode layer disposed above the shield layer; and
a processing device comprising:
a first channel coupled to the electrode layer, the first channel to measure a first signal indicative of a touch object proximate to the electrode layer, the first signal comprising a touch data component and the first noise component generated by the display device; and
a second channel coupled to the shield layer, the second channel to measure a second signal comprising the second noise component generated by the display device; and
wherein the processing device to:
generate an estimated noise signal using the second noise component of the second signal associated with the second channel, wherein the estimated noise signal is an estimation of the first noise component of the first signal; and
subtract the estimated noise signal from the measured first signal to obtain the touch data component of the first signal.

17. The system of claim 16, further comprising:
a capacitor coupled in series with the second channel and the shield layer.

18. The system of claim 17, further comprising:
a resistor comprising:
a first terminal coupled between the shield layer and the second channel; and
a second terminal coupled to a ground potential.

19. The system of claim 18, wherein at least one of the capacitor or resistor is integrated into the processing device.

20. The system of claim 16, wherein to measure the first signal indicative of the touch object proximate to the electrode layer, the first channel comprises:
a first buffer to buffer the first signal; and
a first integrator to integrate the buffered first signal; and
wherein to measure the second signal comprising the second noise component generated by the display device, the second channel comprises:
a second buffer to buffer the second signal; and
a second integrator to integrate the buffered second signal.

* * * * *